(12) United States Patent  (10) Patent No.: US 8,026,403 B2
Hassan et al.  (45) Date of Patent: Sep. 27, 2011

(54) SYSTEM AND PROCESS FOR PRODUCTION OF LIQUID PRODUCT FROM LIGHT GAS

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation

( * ) Notice: Subject to any disclaimer, the term of this patent is extended or adjusted under 35 U.S.C. 154(b) by 365 days.

(21) Appl. No.: 12/140,763

(22) Filed: Jun. 17, 2008

(65) Prior Publication Data

US 2009/0001316 A1 Jan. 1, 2009

Related U.S. Application Data

(60) Provisional application No. 60/946,444, filed on Jun. 27, 2007, provisional application No. 61/039,235, filed on Mar. 25, 2008.

(51) Int. Cl.
*C07C 6/08* (2006.01)
(52) U.S. Cl. ........ 585/708; 585/639; 585/609; 585/637; 585/643; 585/922; 554/141; 562/412
(58) Field of Classification Search .................. None
See application file for complete search history.

(56) References Cited

U.S. PATENT DOCUMENTS

| | | | |
|---|---|---|---|
| 4,931,225 A | 6/1990 | Cheng | |
| 5,597,044 A * | 1/1997 | Roberts et al. | 169/46 |
| 5,877,350 A | 3/1999 | Langer et al. | |
| 6,368,367 B1 | 4/2002 | Langer et al. | |
| 6,383,237 B1 | 5/2002 | Langer et al. | |
| 6,868,366 B1 | 3/2005 | Langer et al. | |
| 6,924,316 B2 | 8/2005 | Iwamoto et al. | |
| 2002/0089074 A1 * | 7/2002 | Holl | 261/92 |
| 2003/0043690 A1 | 3/2003 | Holl | |
| 2004/0052158 A1 | 3/2004 | Holl | |
| 2005/0033069 A1 | 2/2005 | Holl et al. | |
| 2009/0075364 A1 * | 3/2009 | Fabiyi et al. | 435/290.2 |
| 2009/0205488 A1 * | 8/2009 | Betting et al. | 95/30 |

FOREIGN PATENT DOCUMENTS

| | | |
|---|---|---|
| DE | 4235558 A | 5/1994 |
| FR | 2825996 A | 12/2002 |

* cited by examiner

*Primary Examiner* — Tam M Nguyen
(74) *Attorney, Agent, or Firm* — Porter Hedges LLP; Timothy S. Westby

(57) ABSTRACT

A method for producing a product comprising at least one selected from $C_{2+}$ hydrocarbons, oxygenates, and combinations thereof from light gas comprising one or more of carbon dioxide, methane, ethane, propane, butane, pentane, and methanol by forming a dispersion of light gas in a liquid feed, wherein the dispersion is formed at least in part with high shear forces and wherein at least one of the liquid feed and the light gas is a hydrogen source. A system for carrying out the method is also presented.

24 Claims, 2 Drawing Sheets

SYSTEM AND PROCESS FOR PRODUCTION OF LIQUID PRODUCT FROM LIGHT GAS

CROSS-REFERENCE TO RELATED APPLICATIONS

This application claims the benefit under 35 U.S.C. §119(e) of U.S. Provisional Patent Application No. 60/946,444 entitled, "High Shear Process for Production of Methanol," filed Jun. 27, 2007, and U.S. Provisional Patent Application No. 61/039,235 entitled, "High Shear System and Method for Production of Liquid Product from Carbon Dioxide and/or Methane Gas," filed Mar. 25, 2008, the disclosures of which are hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present invention generally relates to the conversion of light gases such as carbon dioxide and/or methane into hydrocarbons and/or liquid oxygenates. The invention relates more particularly to apparatus and methods for producing liquid oxygenates and/or hydrocarbons from a light gas such as carbon dioxide and/or methane by high shear contacting of reactants.

2. Background of the Invention

The effect of increasing carbon dioxide emission on global warming is a major concern of scientists and governments due to its effect on the environment. The increased use of fossil fuels as a source of power and heat is the main reason for the increase in carbon dioxide emissions. The combustion of fossil fuels is an exothermic process where the energy released is typically used for heating and/or conversion to other forms of energy such as mechanical energy. Oxidation of hydrocarbons is also common practice in chemical reactions such as oxidation of ethylene, Fischer Tropsch and other reactions. The resulting effluent from combustion of hydrocarbon depends on the make up of the hydrocarbon but is mainly carbon dioxide and water. Releasing large amounts of carbon dioxide into the atmosphere is believed to be responsible for adverse effects to the environment and there are efforts underway to reduce carbon dioxide emissions to help abate these negative effects.

A viable solution to the deleterious environmental effects of carbon dioxide emissions should result in a net reduction of carbon dioxide emissions. Technologies to sequester carbon dioxide can consume large amounts of energy, the energy, in many cases, derived from fossil fuels, and thus resulting in little or no net reduction in carbon dioxide, or worse yet a net increase in carbon dioxide production.

A process that allows recycling carbon dioxide to produce a valuable product such as fuel or chemical feedstock would be of great benefit in reducing the purported effects of carbon dioxide on global warming. It would be additionally beneficial to develop a process to convert carbon dioxide into a liquid fuel that can be transported and/or used as a feedstock for refinery or petrochemical processes.

Methane is an important building block in organic reactions used in industry as well as an important fuel source. The methane content of natural gas may vary within the range of from about 40 volume percent to about 95 volume percent. Other constituents of natural gas may include ethane, propane, butanes, pentane (and heavier hydrocarbons), hydrogen sulfide, carbon dioxide, helium and nitrogen. Natural gas in liquid form has a density of 0.415 and a boiling point of minus 162° C. It is therefore not readily adaptable to transport as a liquid except for marine transport in very large tanks with a low surface to volume ratio. Large-scale use of natural gas often requires a sophisticated and extensive pipeline system. A significant portion of the known natural gas reserves is associated with remote fields, to which access is difficult. For many of these remote fields, pipelining to bring the gas to potential users is not economically feasible. Economically transporting methane from remote areas by converting the gas to a liquid has long been sought in the industry.

Indirectly converting methane to methanol by steam-reforming to produce synthesis gas as a first step, followed by catalytic synthesis of methanol is a well-known process. Aside from the technical complexity and the high cost of this two-step, indirect synthesis, the methanol product has a limited market and the process thus does not appear to offer a practical way to utilize natural gas from remote fields.

A process that provides an effective means for catalytically converting methanol to gasoline is described in U.S. Pat. No. 3,894,107 (Butter et al.). Although the market for gasoline is large relative to the market for methanol, and although this process is currently used in New Zealand, it is complex and its viability appears to be limited to situations in which the cost for supplying an alternative source of gasoline is high.

Attempts to carry out the partial oxidation of methane to liquid compounds (such as methanol or ethanol) in the gas phase have met with limited success because of difficulties in controlling the free radical processes that are involved. Since methanol is more reactive than methane, the undesirable formation of CO and $CO_2$ via secondary combustion has been unavoidable. While a variety of catalysts, mostly metal oxides, have been reported for the partial oxidation of methane to methanol, the reaction has required high temperatures and the reported methanol yields based on methane have generally been less than 10%.

Indirect approaches for the conversion of methane to methanol have been reported by Bjerrum, U.S. Pat. No. 6,380,444; Periana, U.S. Pat. No. 5,233,113; and Chang, U.S. Pat. No. 4,543,434. The general reaction system used for these approaches utilize a small quantity of a radical initiator (acid) that will strip a hydrogen atom from methane, to generate methyl radicals and a small quantity of acid. Some patents have demonstrated that methane can be converted to methyl bisulfate in a single-step using Group VIII noble metal catalyst (such as platinum or palladium), and a strong inorganic acid such as sulfuric acid. Other patents describe processes which do not utilize catalyst in the conversion of methane to methanol (e.g., European Patent No. 1,558,353). Chlorine and other halogen containing acids have also been utilized in a similar manner to convert methane to methanol and other liquids. These processes tend to encounter problems with corrosion at elevated temperatures, produce relatively low yields of methanol, and create unwanted byproduct.

U.S. Pat. No. 7,282,603 to Richards discloses anhydrous processing of methane into methane sulfonic acid, methanol and other compounds and provides an overview of some of the past approaches to converting methane into methanol. The approach of Richards avoids the use or creation of water, and utilizes a radical initiator compound such as halogen gas or Marshall's acid to create methyl radicals.

Existing processes and production facilities for producing liquids from methane are typically subject to various constraints such as mass flow and product yield limitations and plant size and energy consumption requirements.

Accordingly, in view of the art, there is a need for efficient and economical methods and systems for converting carbon dioxide and/or low molecular weight alkanes, in particular methane, into valuable products whereby the emission of carbon dioxide into the environment may be reduced and/or a system and process whereby a light gas stream comprising carbon dioxide and/or methane may be converted into a liquid product. The greenhouse gas problem is addressed by the herein disclosed system and process for the conversion of carbon dioxide to hydrocarbons and/or oxygenates through the use of a high shear reactor. Such systems and methods should permit increased selectivity and yield of liquid oxygenates and conversion of methane and/or carbon dioxide, while allowing economically favorable conditions of operating temperature, pressure and/or reaction time.

SUMMARY

High shear systems and methods for improving conversion of light gas to hydrocarbons and/or organic oxygenates are disclosed. The system and method may be used to produce hydrocarbons or hydrocarbon mixtures suitable for driving conventional combustion engines or hydrocarbons suitable for further industrial processing or other commercial use. Intermediate products such as methanol or dimethyl ether may also be generated by the process disclosed herein. The overall process comprises in an embodiment the conversion of gas selected from carbon dioxide, methane, ethane, propane, butane, pentane and combinations thereof to hydrocarbons with carbon numbers greater than 2, preferably $C_5$-$C_{10}$ hydrocarbons and/or oxygenates, such as methanol. In other instances, the method comprises the use of high shear technology for the direct conversion of methane (a major component of available natural gas) to liquid hydrocarbons, primarily organic oxygenates and other liquids. The organic oxygenate product may primarily comprise alcohols. In embodiments, the organic oxygenate product comprises methanol. In embodiments, methanol and carbon dioxide are converted into organic oxygenate product comprising ethanol.

The present disclosure provides a system and process for the production of hydrocarbons and/or oxygenates from light gas comprising carbon dioxide and/or at least one C1-C5 alkane using at least one high shear reactor device to dissociate reactor feedstock into free radicals by providing intimate contact of reactants and promoting chemical reactions between multiphase reactants. The resulting hydrogen and/or oxygen radicals react with carbon dioxide and/or alkane to yield the product comprising hydrocarbons and/or oxygenates. The high shear device makes favorable reaction(s) that may not be favorable using conventional reactors and operating conditions (i.e. when ΔG based on global conditions is positive).

In one embodiment, the process comprises providing water and carbon dioxide gas into a high shear reactor. Within the high shear reactor system, the water and carbon dioxide may be dissociated into components. Subsequently, the components recombine to produce a product comprising higher carbon number (i.e. $C_{2+}$, preferably $C_5$-$C_{10}$) hydrocarbons and/or oxygenates. The process comprises the use of at least one external high shear device to provide for production of oxygenates and/or hydrocarbons without the need for large volume reactors. In embodiments, the addition of water serves to assist in steam stripping of organics present in vessel 10.

Another aspect of this disclosure is a process for production of hydrocarbons and/or oxygenates from carbon dioxide and/or methane and a source of hydrogen such as simple hydrocarbons or other hydrocarbon source. Water may also optionally or additionally be present as a source of free hydrogen and hydroxyl radicals. In embodiments of the method, the hydrogen source is selected from water, lower alkanes, and combinations thereof. The reaction may be catalyzed with catalytic compounds known to act as dehydrogenation catalyst. In embodiments, the hydrogen source may be a gas, e.g. hydrogen gas, or hydrogen dissociated in HSD 40 from simple gaseous alkane and the liquid in line 21 may be a carrier, such as poly ethylene glycol.

In accordance with certain embodiments, a method is presented for producing product comprising at least one selected from $C_{2+}$ hydrocarbons, oxygenates, and combinations thereof from light gas comprising one or more of carbon dioxide, methane, ethane, propane, butane, pentane, and methanol, the method comprising forming a dispersion of light gas in a liquid feed, wherein the dispersion is formed at least in part with high shear forces, and wherein at least one of the liquid feed and the light gas is a hydrogen source. Forming a dispersion may comprise generating bubbles of light gas having a mean diameter in the range of about 0.1 to about 1.5 micron. In embodiments, the gas bubbles have a mean diameter less than about 0.4 micron.

In some embodiments, the high shear forces are produced with at least one high shear device. The at least one high shear device may comprise at least one generator comprising a stator and a complementary rotor. The rotor and stator may be separated by a minimum clearance in the range of from about 0.02 mm to about 3 mm. In embodiments, forming the dispersion comprises a tip speed of the rotor of greater than 5.0 m/s (1000 ft/min). In embodiments, forming the dispersion comprises a tip speed of the rotor of greater than 20 m/s (4000 ft/min). In embodiments, the at least one high shear device comprises at least two generators. Forming the dispersion may comprise subjecting a mixture of the light gas and the liquid feed to a shear rate of greater than about $20,000 s^{-1}$. The high shear device may produce a local pressure of at least about 1034.2 MPa (150,000 psi) at the tip of the rotor during formation of the dispersion. The energy expenditure of the high shear device may be greater than 1000 W/m³ during formation of the dispersion.

In some embodiments of the method for producing product comprising at least one selected from $C_{2+}$ hydrocarbons, oxygenates, and combinations thereof from light gas, the dispersion further comprises a catalyst. The catalyst may comprise ruthenium. The catalyst may comprise ruthenium trichloride heptahydrate. The method may further comprise introducing the dispersion into a fixed bed reactor comprising a bed of catalyst. The fixed bed of catalyst may comprise ruthenium carbonyl.

Also disclosed herein is a method for producing product comprising at least one selected from liquid oxygenates, $C_{2+}$ hydrocarbons, and combinations thereof comprising subjecting a fluid mixture comprising a light gas comprising carbon dioxide, methane, or both and a liquid medium to a shear rate greater than 20,000 $s^{-1}$ to produce a dispersion of light gas in a continuous phase of the liquid, wherein the dispersion is formed at least in part with at least one high shear device, the at least one high shear device configured to produce a dispersion of bubbles of the light gas in the liquid medium, and introducing the dispersion into a reactor from which the product comprising at least one selected from liquid oxygenates, $C_{2+}$ hydrocarbons, and combinations thereof is removed. The method may further comprise separating the reactor product into a gas stream and a liquid product stream comprising liquid product, and recycling at least a portion of the gas stream to the external high shear device. In embodiments, the dispersion has an average bubble diameter in the range of about 0.1 to about 1.5 micron. In embodiments, the dispersion has an average bubble diameter of less than 1 micron. The dispersion may be stable for at least about 15 minutes at atmospheric pressure. In embodiments, the high shear device comprises at least two generators. The dispersion may further comprise at least one catalyst.

Also disclosed herein is a system for converting a gas comprising carbon dioxide, methane, ethane, propane, butane, or a combination thereof to product comprising at least one selected from liquid oxygenates, $C_{2+}$ hydrocarbons, and combinations thereof, the system comprising at least one high shear mixing device comprising at least one generator comprising a rotor and a stator separated by a shear gap, wherein the shear gap is the minimum distance between the rotor and the stator, and wherein the high shear mixing device is capable of producing a tip speed of the rotor of greater than 22.9 m/s (4,500 ft/min), and a pump configured for delivering a mixture comprising light gas and a liquid medium to the high shear mixing device. The system may further comprise a reactor disposed between the at least one high shear device and the pump, the reactor comprising a product outlet and an inlet configured to receive the dispersion from the dispersion outlet of the at least one high shear device. The at least one high shear device may comprise at least two generators. The shear rate provided by one generator may be greater than the shear rate provided by another generator. The at least one high shear mixing device may be configured for producing a dispersion of light gas bubbles in a liquid phase comprising liquid medium; wherein the dispersion has a mean bubble diameter of less than 400 nm. The at least one high shear mixing device may be capable of producing a tip speed of the rotor of at least 40.1 m/s (7,900 ft/min). The system may comprise at least two high shear mixing devices.

Some embodiments of the system potentially make possible the production of organic liquid product from gas comprising carbon dioxide, methane, ethane, propane, butane, pentane, methanol or a combination thereof without the need for large volume reactors, via use of an external pressurized high shear reactor.

Certain embodiments of an above-described method or system potentially provide for more optimal time, temperature and pressure conditions than are otherwise possible, and which potentially increase the rate of the multiphase process. Certain embodiments of the above-described methods or systems potentially provide overall cost reduction by operating at lower temperature and/or pressure, providing increased product per unit of catalyst consumed, decreased reaction time, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
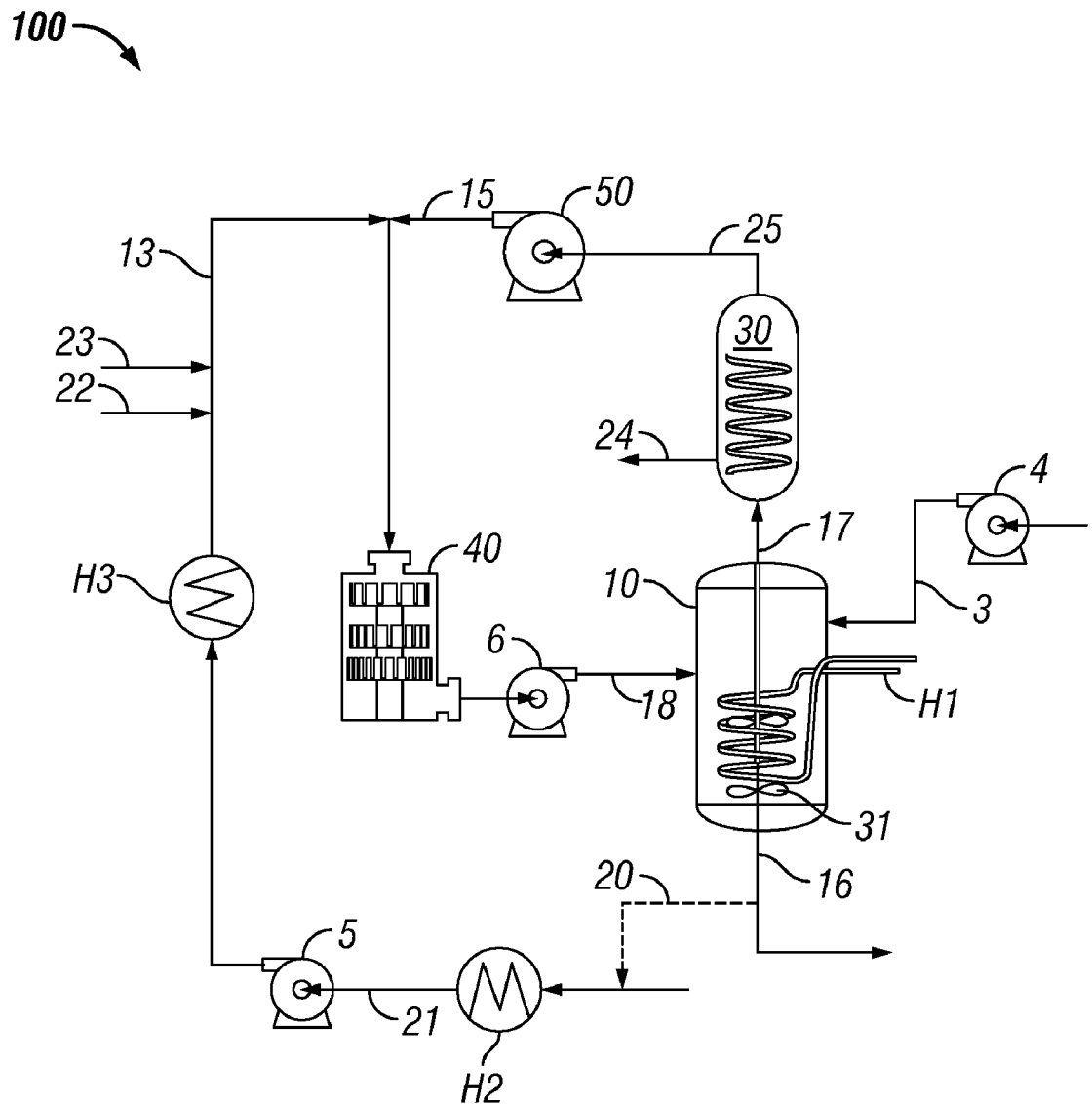
FIG. 1 is a schematic of a multiphase reaction system according to an embodiment of the present disclosure comprising external high shear dispersing.

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

The term "oxygenate is used herein to refer to substances that have been infused with oxygen. For example, the term refers to any oxygen comprising hydrocarbon such as high octane gasoline or diesel, suitable to drive combustion engines, as well as to oxygenated fuels sometimes employed as gasoline additives to reduce carbon monoxide that is created during the burning of the fuel. The term "oxygenate" includes, but is not limited to, aldehydes such as formaldehyde, methyl formate, and formic acid as well as oxygenates based on alcohols including: methanol, ethanol, isopropyl alcohol, n-propyl alcohol, n-butanol, 2-ethyl hexanol, furfuryl alcohol, benzyl alcohol, isobutyl alcohol, and gasoline grade t-butanol (GTBA).

The terms "simple alkane" and "low molecular weight alkane" are used herein to refer to low carbon number alkanes including methane, propane, and butane, which are gaseous at room temperature and atmospheric pressure.

The term "light gas" as utilized herein refers to a gas comprising carbon dioxide, simple alkanes having from one to five carbon atoms or a combination thereof.

DETAILED DESCRIPTION

Overview. The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction.

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes.

The present invention utilizes innovative technology to produce organic product comprising hydrocarbons and/or liquid oxygenates from light gas such as carbon dioxide and/or simple alkanes. The light gas is intimately mixed with a liquid medium. At least one of the light gas and the liquid medium serves as hydrogen source. The hydrogen source may be, for example, water and/or hydrocarbons. A high shear reactor device and optionally a catalyst may dissociate reactants into free radicals allowing them to reform into product comprising hydrocarbons and oxygenates.

The system comprises the use of high shear technology for the conversion of carbon dioxide (a major greenhouse gas) and/or simple alkanes to products comprising liquid hydrocarbons, organic oxygenates or combinations thereof. The herein disclosed process and system for the production of hydrocarbons and/or liquid oxygenates via multiphase conversion of carbon dioxide and/or light gas, and a dehydrogenation catalyst employs an external high shear mechanical device to provide rapid contact and mixing of chemical ingredients in a controlled environment in a high shear device. The use of at least one high shear device reduces mass transfer limitations on the reaction(s) thus increasing rates of mass transfer and enabling reactions to more closely approach kinetic limitations and also producing localized non-ideal conditions that permit reactions to occur that would not otherwise be expected to occur based on Gibbs free energy predictions, as discussed further hereinbelow.

System for Production of Liquids from Light Gas. A high shear system for the production of hydrocarbons and/or liquid oxygenates from light gas will now be described in relation to FIG. 1, which is a process flow diagram of a representative high shear system 100 for the production of organic oxygenates/hydrocarbons via conversion of light gas. The basic components of a representative system include external high shear mixing device (HSD) 40, vessel 10, and pump 5. As shown in FIG. 1, high shear device 40 is located external to vessel/reactor 10. Each of these components is further described in more detail below. Line 21 is connected to pump 5 for introducing liquid medium. Line 13 connects pump 5 to HSD 40, and line 18 connects HSD 40 to vessel 10. One or more line may be connected to line 13 for introducing reactant gas (e.g., carbon dioxide and/or methane gas). For example, in the embodiment in FIG. 1, lines 22 and 23 are connected to line 13. Alternatively, lines 22 and/or 23 may be connected to an inlet of HSD 40. Line 17 may be connected to vessel 10 for removal of unreacted reactant gas and/or reaction product gases. Product outlet line 16 is connected to vessel 10 for removal of liquids from vessel 10. In embodiments, product line 16 may be connected to line 21 or line 13, to provide for multi-pass operation, if desired.

Additional components may be incorporated between vessel 10, external high shear device 40, and pump 5 in some applications of the process, as will become apparent upon reading the description of the high shear process for production of organic product described hereinbelow. For example, high shear system 100 may further comprise condenser 30, compressor 50, feed pump 4, high pressure pump 6, or a combination thereof. As shown in FIG. 1, high shear system 100 may further comprise one or more additional pumps, such as feed pump 4, booster pump 6, or other pumps as necessary. Heat exchangers may be positioned throughout system 100. In embodiments, temperature control equipment is internal to vessel 10, or positioned on a line within system 100. For example, in the embodiment of FIG. 1, heat exchanger H1 is associated with vessel 10, heat exchanger H2 is positioned on line 21, and heat exchanger H3 is positioned on line 13. A heat exchanger may be positioned on line 16 of vessel 10 and may serve to adjust the temperature of reaction products exiting vessel 10.

High Shear Mixing Device. External high shear mixing device (HSD) 40, also sometimes referred to as a high shear device or high shear mixing device, is configured for receiving an inlet stream, via line 13, comprising liquid medium and dispersible light gas. Alternatively, HSD 40 may be configured for receiving the liquid and gaseous reactant streams via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles in a reactant mixture flowing through the high shear device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 W/m$^3$. In embodiments, the energy expenditure of HSD 40 is in the range of from about 3000 W/m$^3$ to about 7500 W/m$^3$.

The shear rate is the tip speed divided by the shear gap width (minimal clearance between the rotor and stator). The shear rate generated in HSD 40 may be in the greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$.

HSD 40 is capable of dispersing or transporting light gas into a main liquid phase (continuous phase) with which it would normally be immiscible, at conditions such that at least a portion of the gas is converted to an organic product comprising $C_{2+}$ hydrocarbons, oxygenates, or a combination thereof. The liquid medium may comprise at least one hydrogen source (e.g. simple liquid hydrocarbon or water). In embodiments, the liquid medium further comprises a catalyst. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size (e.g., light gas bubbles). In some embodiments, each of the stages is operated with super-fine generator. In some embodiments, at least one of the generator sets has a rotor/stator minimum clearance (shear gap width) of greater than about 5.0 mm (0.20 inch). In alternative embodiments, at least one of the generator sets has a minimum rotor/stator clearance of greater than about 1.78 mm (0.07 inch).

Figure 2:
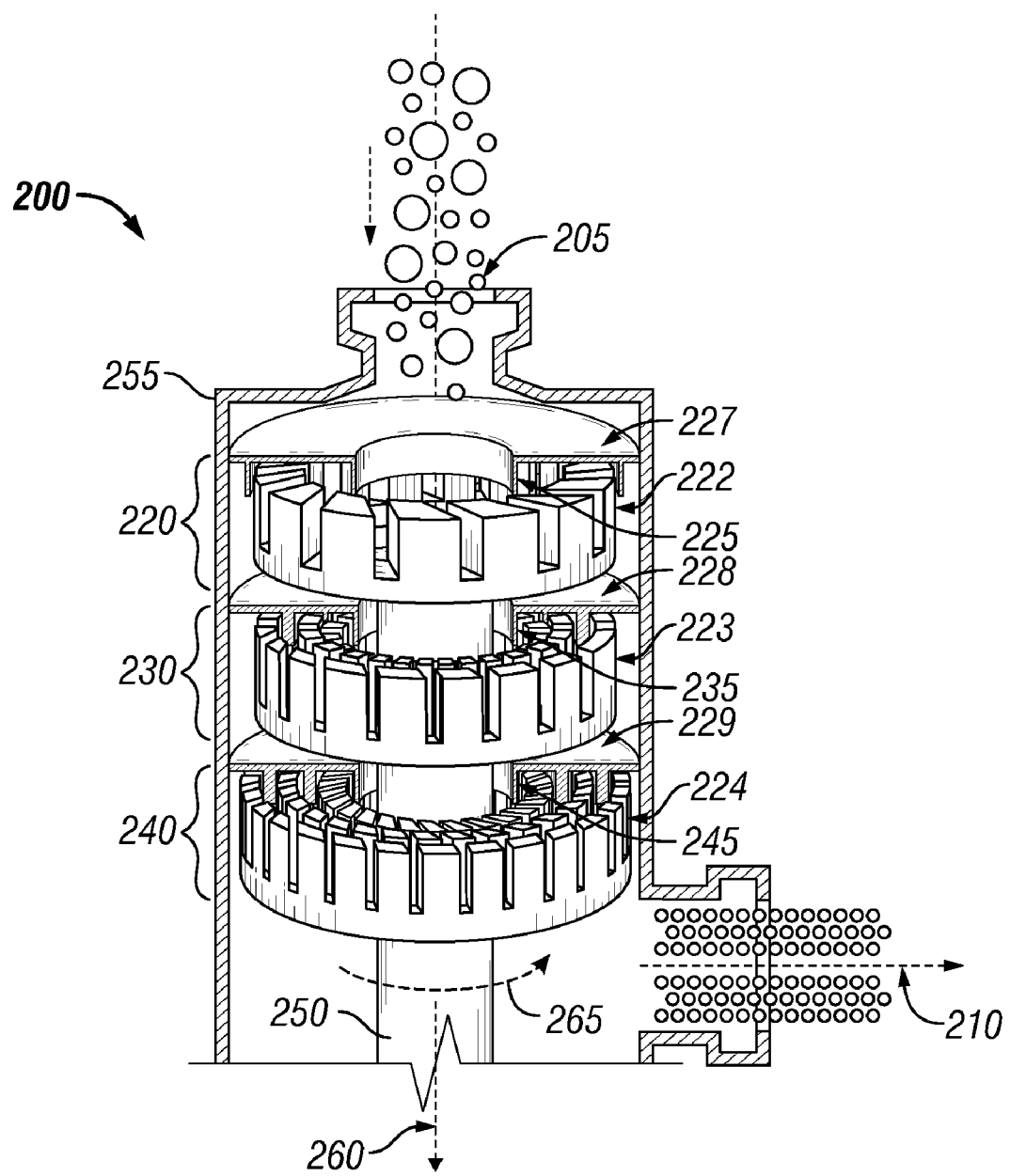
FIG. 2 is a longitudinal cross-section view of a multi-stage high shear device, as employed in an embodiment of the system.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10.0 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid particles are to be sent through high shear device 40, the appropriate shear gap width (minimum clearance between rotor and stator) may be selected for an appropriate reduction in particle size and increase in particle surface area. In embodiments, this may be beneficial for increasing surface area of solid catalyst by shearing and dispersing the particles.

High shear device 200 is configured for receiving from line 13 a reaction mixture at inlet 205. The reaction mixture comprises gas as the dispersible phase and liquid medium as the continuous phase. The feed stream may further comprise a particulate solid catalyst component. Feed stream entering inlet 205 is pumped serially through generators 220, 230, and then 240, such that a dispersion is formed. The dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create the dispersion. The product dispersion exits high shear device 200 via high shear outlet 210 (and line 18 of FIG. 1).

The produced dispersion has an average gas bubble size less than about 5 µm. In embodiments, HSD 40 produces a dispersion having a mean bubble size of less than about 1.5 µm. In embodiments, HSD 40 produces a dispersion having a mean bubble size of less than 1 µm; preferably the bubbles are sub-micron in diameter. In certain instances, the average bubble size is from about 0.1 µm to about 1.0 µm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising dispersed gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid catalyst particles (if present), thereby further facilitating and accelerating the conversion reaction through enhanced transport of reactants in a heterogeneous reaction mixture.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2HP power, output speed of 7900 rpm, flow capacity (water) approximately 300-700 L/h (depending on generator), a tip speed of from 9.4-41 m/s (1850 ft/min to 8070 ft/min).

Vessel. Once dispersed, the dispersion exits high shear device 40 via high shear device outlet dispersion line 18 and is introduced into vessel 10. Vessel 10 may comprise any type of reactor in which multiphase reaction can be propagated to carry out the conversion reaction(s). For instance, a continuous or semi-continuous stirred tank reactor, or one or more batch reactors may be employed in series or in parallel. In some embodiments, vessel 10 is a tower reactor. In some applications, vessel 10 is a tubular reactor, and in others a tubular reactor or multi-tubular reactor.

Any number of reactor inlet lines is envisioned, with one shown in FIG. 1 (line 3). An inlet line may be connected to vessel 10 for receiving a catalyst solution or slurry during operation of the system with heterogeneous catalyst. In embodiments, water is injected into vessel 10 to assist in steam stripping of organics present within vessel 10. In this manner, a portion of the organic product may be stripped with steam and exit vessel 10 in line 17 rather than in line 16. Vessel 10 may comprise an exit line 17 for vent gas, and an outlet product line 16 for a product stream. In embodiments, vessel 10 comprises a plurality of reactor product lines 16.

Conversion of carbon dioxide and/or simple hydrocarbons to organic oxygenates/hydrocarbons will occur wherever suitable time, temperature and pressure conditions exist. In this sense hydrogenation could occur at any point in the flow diagram of FIG. 1 if temperature and pressure conditions are suitable. The reaction carried out by high shear system 100 may comprise a homogeneous catalytic reaction in which the catalyst is in the same phase as another component of the reaction mixture or a heterogeneous catalytic reaction involving a solid catalyst. Where a circulated catalyst is utilized, reaction is more likely to occur at points outside vessel 10 shown of FIG. 1. Nonetheless a discrete reactor/vessel 10 is often desirable to allow for increased residence time, agitation and heating and/or cooling, as well as for separation and recovery of volatile reaction products and recycling of non-reacted gases. Thus, in some embodiments, high shear system 100 further comprises a vessel 10 downstream of the at least one high shear device, wherein an inlet of the vessel is fluidly connected with the dispersion outlet of the high shear device. When a fixed bed reactor 10 is utilized, the reactor/vessel 10 may become the primary location for the reaction to occur.

Vessel 10 outlet line 16 may be fluidly connected to line 21, for example via line 20, for recycle of a portion of the contents in line 16 comprising liquid product to HSD 40. Alternatively, a separate outlet line may connect vessel 10 with line 21 in some embodiments. In FIG. 1, high shear system 100 is configured for recycle of a portion of line 16. This configuration is one which lends itself to multi-pass operation, for example.

Vessel 10 may include one or more of the following components: stirring system, temperature control capabilities, pressure measurement instrumentation, temperature measurement instrumentation, one or more injection points, and level regulator (not shown), as are known in the art of reaction vessel design. As shown in the embodiment of FIG. 1, vessel 10 may further comprise stirring system 31; heating and/or cooling capabilities H1, pressure measurement instrumentation, temperature measurement instrumentation, or a combination thereof. For example, stirring system 31 may include a motor driven mixer. A temperature control apparatus H1 may comprise, for example, a heating mantle or cooling coils. Alternatively, as much of the conversion reaction may occur within HSD 40 in some embodiments, vessel 10 may serve primarily as a storage vessel in some cases. Although generally less desired, in some applications vessel 10 may be omitted, particularly if multiple high shear devices/reactors are employed in series, as further described below.

Heat Transfer Devices. In addition to the above-mentioned heating/cooling capabilities of vessel 10, other external or internal heat transfer devices for heating or cooling a process stream are also contemplated in variations of the embodiments illustrated in FIG. 1. For example, temperature control may be provided to vessel 10 via internal heat transfer devices as known to one skilled in the art. The use of external heating and/or cooling heat transfer devices is also contemplated. Some suitable locations for one or more such heat transfer devices are between pump 5 and HSD 40, between HSD 40 and vessel 10, and between vessel 10 and pump 5 when system 100 is operated in multi-pass mode. Some non-limiting examples of such heat transfer devices are shell, tube, plate, and coil heat exchangers, as are known in the art.

In the embodiment of high shear system 100 in FIG. 1, three heat transfer devices are used to control temperature throughout the system. Heat transfer device H1 is used to control the temperature of the product in vessel 10. Heat transfer device H2 is positioned on line 21 for controlling temperature in line 21. Heat transfer device H3 serves to control the temperature of line 13 and thereby control the temperature of the inlet feedstream to HSD 40. Use and configuration of heating/cooling devices is for the purpose of carrying out the desired reaction and may be altered accordingly as known to those of skill in the art.

Pump(s)/Cold Trap. Pump 5 is configured for either continuous or semi-continuous operation, and may be any suitable pumping device that is capable of providing greater than 202.65 kPa (2 atm) pressure, alternatively greater than 303.975 kPa (3 atm) pressure, to allow controlled flow through HSD 40 and system 100. For example, a Roper Type 1 gear pump, Roper Pump Company (Commerce Georgia) Dayton Pressure Booster Pump Model 2P372E, Dayton Electric Co (Niles, Ill.) is one suitable pump. All contact parts of the pump may comprise stainless steel, for example, 316 stainless steel. In some embodiments of the system, pump 5 is capable of pressures greater than about 2026.5 kPa (20 atm). In embodiments, pump 5 produces a flow rate of liquid medium in line 21 of between about 0.5 and about 1 gallon/min. In embodiments, pump 5 produces a flow rate of liquid medium in line 21 of about 1 gallon/min.

In addition to pump 5, one or more additional, high pressure pump (not shown) may be included in the system illustrated in FIG. 1. For example, a booster pump, which may be similar to pump 5, may be included between HSD 40 and vessel 10 for boosting the pressure into vessel 10. In the embodiment of FIG. 1, high shear system 100 further comprises a high pressure pump 6 for boosting the pressure into vessel 10. When pump 6 is incorporated as a booster pump, pump 5 may be used as a throttling pump/valve to reduce pressure to the high shear unit, thus reducing wear thereof. As still another example, a compressor type pump may be positioned between line 17 and HSD 40 for recycling gas from vessel 10 to an inlet of the high shear device.

As another example, a supplemental feed pump, which may be similar to pump 5, may be included for introducing additional reactants or catalyst into vessel 10. In the embodiment of FIG. 1, for example, supplemental feed pump 4 is used to introduce additional raw materials into vessel 10 through injection line 3. Catalyst and make-up fluids may be periodically or continuously added as needed to high shear system 100 via feed pump 4 and injection point 3.

As shown in FIG. 1, high shear system 100 may further comprise a cold trap, for example, within condenser 30, positioned on recycle line 17. The cold trap serves to take the recycle gases 17 into an ice cooler receiver from which the gas in line 25 is piped to compressor 50 to be injected into high shear device 40 via line 15. Condenser 28 comprises an outlet line 24 for condensed product (e.g. any oxygenates and/or hydrocarbons) and an outlet line 25 for a recycle gas stream. In embodiments, cold trap of condenser 30 serves to remove primarily alcohols from recycle line 17 upstream of recirculation pump or compressor 50. Recycle line 15 may be fluidly connected to line 13 for reintroduction of light gas to HSD 40, as shown in FIG. 1.

Production of Organic Product by Conversion of Light Gas. Operation of high shear system 100 will now be discussed with reference to FIG. 1. As shown in the embodiment of high shear system 100 in FIG. 1, in embodiments, system 100 comprises two or more dispersible gas streams. For example, in some embodiments, high shear system 100 comprises dispersible gas line 22 and dispersible gas line 23. In operation for the conversion of light gas to organic product, a dispersible light gas stream is introduced into system 100 via line 22 and/or line 23, and combined in line 13 with a liquid stream. Dispersible gas in line 22 and/or line 23, compressed recycle fluid in line 15 and liquid medium in line 21 are introduced separately or as a mixed stream into external high shear device 40. As shown in FIG. 1, in embodiments, dispersible gas stream in line 22 and/or line 23 is introduced into liquid medium (which may comprise hydrogen source or hydrogen source and catalyst) and the combined gas/liquid (or gas/liquid/solid) stream is introduced into HSD 40.

Dispersible gas introduced into HSD 40 comprises light gas. The light gas to be dispersed in HSD 40 may comprise methane, carbon dioxide, or a combination thereof. As sources of natural gas often comprise additional gaseous components, the light gas introduced into line 13 via line 22, and/or line 23 may further comprise up to about 10% of additional gaseous components. The additional gaseous components may be, for example, ethane, propane, butane, pentane, methanol or a combination thereof. In some embodiments, light gas comprises ethane, propane, butane, or a combination thereof, and light gas in line 23 comprises carbon dioxide. In specific embodiments, light gas comprises methane. In embodiments, dispersible light gas comprises carbon dioxide. In embodiments, light gas comprises carbon dioxide and methane. In embodiments, light gas comprises a 2:1 ratio of methane to carbon dioxide. In embodiments, the light gas comprises carbon dioxide, hydrogen, and carbon monoxide. In embodiments, light gas is continuously fed into line 13. In embodiments, the feed rate of dispersible light gas is greater than about 50 cc/min. Alternatively, the feed rate of dispersible light gas is greater than about 80 cc/min. Alternatively, the feed rate of dispersible light gas is greater than about 2300 cc/min.

The liquid medium may be a variety of types. The liquid medium in line 21 may comprise at least one hydrogen source. The at least one hydrogen source may be selected from water, hydrocarbons, and combinations thereof. In embodiments, liquid medium is selected from water, lower molecular weight liquid alkanes, paraffinic oils and combinations thereof. The paraffinic oil may be either hydroprocessed petroleum derived oil, such as the Paralux oils as supplied by Chevron Products Company or synthetic paraffin oils. Suitable synthetic paraffinic oils include, for example, poly-alpha olefins (API) Group IV base oil as well as hydrocracked/hydroisomerized (API) Group III base oils. Such Group (IV) base oil includes oil such as a low weight component of Poly-ethylene-propylene. Petrochemical companies have developed processes involving catalytic conversion of feed stocks under pressure in the presence of hydrogen into high quality Group III mineral lubricating oil. Additionally, GTL (Gas-To-Liquid) synthetic Group III base stocks are available. Liquid medium may further comprise lithium bromide. Liquid medium is desirably selected such that the components thereof do not flash to a considerable degree under conditions within high shear device 40, but remain liquid therein. In some embodiments, liquid medium comprises polyethylene glycol (PEG).

In embodiments, the liquid medium and catalyst are mixed prior to introduction into vessel 10. For example, paraffinic oil and catalyst (if used) may be initially charged into vessel 10 prior to sealing units. In embodiments, catalyst is added to liquid medium in a stirred beaker. In other embodiments, the liquid medium and catalyst are introduced separately and mixed within vessel 10 via reactor agitator 31. Additional reactants may be added to vessel 10 if desired for a particular application, for example via feed pump 4 and vessel 10 inlet line 3. Any number of vessel 10 inlet lines is envisioned. High shear system 100 may then be sealed and vessel 10 evacuated.

In embodiments, vessel 10 is purged with oxygen. For example, a vacuum may be pulled via reactor gas line 17.

Following evacuation, dispersible light gas may be injected into high shear system 100 until the pressure in vessel 10 reaches a desired range. In embodiments, dispersible light gas is introduced into high shear device 40 until a pressure of 206.8 kPa (30 psi) is attained in vessel 10. Next, high shear device 40 may be placed in operation, reactor agitation via, for example, stirring system 31 continued, and high shear pumping of reactor fluids throughout high shear system 100 commenced. At this point, the system may be a closed loop with no venting.

In embodiments, the dispersible light gas is fed directly into HSD 40, instead of being combined with the liquid medium in line 13. Pump 5 may be operated to pump the liquid medium through line 21, and to build pressure and feed HSD 40, providing a controlled flow throughout high shear device (HSD) 40 and high shear system 100. In some embodiments, pump 5 increases the pressure of the HSD inlet stream to greater than 202.65 kPa (2 atm), alternatively greater than about 303.975 kPa (3 atmospheres). In this way, high shear system 100 may combine high shear with pressure to enhance reactant intimate mixing.

After pumping, the light gas and liquid medium are mixed within HSD 40, which serves to create a fine dispersion of the light gas in the liquid medium. In HSD 40, the light gas and liquid medium are highly dispersed such that nanobubbles, submicron-sized bubbles, and/or microbubbles of the light gas are formed for superior dissolution into solution and enhancement of reactant mixing. For example, disperser IKA® model DR 2000/4, a high shear, three stage dispersing device configured with three rotors in combination with stators, aligned in series, may be used to create the dispersion of dispersible light gas in liquid medium. The rotor/stator sets may be configured as illustrated in FIG. 2, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/stator combination, which may comprise a rotor and a stator having rotor teeth and stator teeth, respectively. The dispersion exits the high shear device via line 18. In some embodiments, the shear rate increases stepwise longitudinally along the direction of the flow, 260.

For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm$^2$ under cavitation conditions. The high shear mixing results in dispersion of the light gas in micron or submicron-sized bubbles. In some embodiments, the resultant dispersion has an average bubble size less than about 1.5 μm. Accordingly, the dispersion exiting HSD 40 via line 18 comprises micron and/or submicron-sized gas bubbles. In some embodiments, the mean bubble size is in the range of about 0.4 μm to about 1.5 μm. In some embodiments, the resultant dispersion has an average bubble size less than 1 μm. In some embodiments, the mean bubble size is less than about 400 nm, and may be about 100 nm in some cases. In many embodiments, the dispersion is able to remain dispersed at atmospheric pressure for at least 15 minutes.

Once dispersed, the resulting gas/liquid or gas/liquid/solid dispersion exits HSD 40 via line 18 and feeds into vessel 10, as illustrated in FIG. 1. Dispersion in line 18 may optionally undergo further processing (heating/cooling) as may be desired in a particular application prior to entering vessel 10. As a result of the intimate mixing of the reactants prior to entering vessel 10, a significant portion of the chemical reaction may take place in HSD 40. Accordingly, in some embodiments, reactor/vessel 10 may be used primarily for heating and separation of product liquids from unreacted light gas and any product gas. Alternatively, or additionally, vessel 10 may serve as a primary reaction vessel where most of the organic product is produced. For example, in embodiments, vessel 10 is a fixed bed reactor comprising a fixed bed of catalyst.

Catalyst. If a catalyst is used to promote the conversion reactions, the catalyst may be introduced as a slurry or catalyst stream into vessel 10, for example via line 3. Alternatively, or additionally, catalyst may be added elsewhere in system 100. For example, catalyst slurry may be injected into line 21. In some embodiments, system 100 comprises a closed slurry loop, and line 21 may contain liquid medium, liquid product, and/or catalyst recycled from line 16.

The method may thus further comprise the use of a hydrogenation catalyst. The catalyst may be one of the MR catalysts listed in Table 1, and further discussed in Example 3 hereinbelow.

TABLE 1

| Catalyst | Catalyst Comps. | Na/Mn | W/Mn | Ti/Mn | Si/Mn | Co/Mn | Fe/Mn | Mo/Mn | Ba/Mn | La/Mn |
|---|---|---|---|---|---|---|---|---|---|---|
| MR 34 | Na, W, Mn | 0.0667 | 0.1000 | — | — | — | — | — | — | — |
| MR 34-2 | Na, W, Mn | 0.0636 | 0.0909 | — | — | — | — | — | — | — |
| MR 34-3 | Na, W, Mn | 1.0000 | 1.0000 | — | — | — | — | — | — | — |
| MR 34-4 | Na, W, Mn | 0.2727 | 0.0909 | — | — | — | — | — | — | — |
| MR 34-5 | Na, W, Mn | 0.0412 | 0.0588 | — | — | — | — | — | — | — |
| MR 34-6 | W, Mn | — | 0.0909 | — | — | — | — | — | — | — |
| MR 34-7 | Na, W, Mn | 0.0636 | 0.0091 | — | — | — | — | — | — | — |
| MR 34-8 | Ti, Na, W, Mn | 0.0636 | 0.0909 | 0.0182 | — | — | — | — | — | — |
| MR 34-9 | Na, Mn | 0.0636 | — | — | — | — | — | — | — | — |
| MR 34-10 | Na, W, Mn | 0.0636 | 0.0545 | — | — | — | — | — | — | — |
| MR 34-11 | Si, Na, W, Mn | 0.0636 | 0.0909 | — | 0.0636 | — | — | — | — | — |
| MR 34-12 | Co, Na, W, Mn | 0.0636 | 0.0909 | — | — | 0.0636 | — | — | — | — |
| MR 34-13 | Na, W, Mn | 0.0636 | 0.1091 | — | — | — | — | — | — | — |
| MR 34-14 | Ba, Mo, Na, W, Mn | 0.0636 | 0.0909 | — | — | — | — | 0.0636 | 0.0636 | — |
| MR 34-15 | Co, Na, W, Mn | 0.0636 | 0.1091 | — | — | 0.1091 | — | — | — | — |
| MR 34-16 | Co, Na, W, Mn | 0.0600 | 0.0800 | — | — | 0.0600 | 0.0600 | — | — | — |
| MR 34-17 | Co, Na, W, Mn | 0.0636 | 0.1091 | — | — | 0.1818 | — | — | — | — |
| MR 34-18 | Co, Na, W, Mn | 0.0636 | 0.1091 | — | — | 0.2545 | — | — | — | — |
| MR-34-18 VII | Co, Na, W, Mn, La | 0.0636 | 0.1091 | — | — | 0.2545 | — | — | — | 0.008 |
| MR 34-19 | Co, Na, W, Mn | 0.0636 | 0.1091 | — | — | 0.2727 | — | — | — | — |

In embodiments, catalyst MR-34-18 or MR-34-18 VII is utilized. The catalyst may comprise at least one of iron, ruthenium, osmium, cobalt, rhodium, iridium, nickel, lanthanum, palladium and platinum or combinations thereof. In specific embodiments, the catalyst comprises ruthenium. The catalyst may comprise ruthenium carbonyl, which is also known as tri-ruthenium dodecacarbonyl [$Ru_3(CO)_{12}$]. In embodiments, a single catalyst is utilized. In embodiments, more than one catalyst is utilized. For example, as discussed in Examples 2-4 hereinbelow, both tri-ruthenium dodecacarbonyl and MR-34-18 VII may be utilized according to this disclosure. In embodiments, the catalyst comprises palladium silica.

In embodiments, the catalyst dehydrogenates water and/or hydrocarbons such as simple alkanes thereby creating free hydrogen and hydroxyl radicals (in the case of water). The hydrogen radicals then deoxygenate carbon dioxide to form carbon monoxide that is then free to react with free hydrogen or other carbon containing radicals.

The system and method of this disclosure pair high shear and possibly cavitation to create conditions not only conducive to generating free hydrogen radicals but also having the potential to generate free hydroxyl radicals and perhaps even deoxygenate carbon dioxide directly.

In some embodiments of the disclosed method, light gas and water are contacted with a catalyst for dissociating water and/or a catalyst for dissociating carbon dioxide and/or alkane. Such catalyst are commonly used in water gas shift reactions The water gas shift (WGS) reaction is a well known catalytic reaction which is used, among other things, to generate hydrogen by chemical reaction of CO with water vapor ($H_2O$) according to the following stoichiometry:

$$CO + H_2O \rightarrow CO_2 + H_2, \quad (1)$$

wherein the reaction typically utilizes a catalyst. Typical catalysts employed in this reaction are based on combinations of iron oxide with chromium at high temperatures (about 350° C.) or mixtures of copper and zinc materials at lower temperatures (about 200° C.).

Dehydrogenation catalysts also include numerous catalytic composites comprising a platinum group component and a modifier metal component selected from the group consisting of a tin component, germanium component, rhenium component, and mixtures thereof are known. For example related U.S. Pat. Nos. 3,632,503, 3,755,481, and 3,878,131 disclose catalysts comprising a platinum group component, a tin component, and a germanium component on a porous carrier material. Compounds comprising rhenium are also well known for their dehydrogenation properties.

Depending on reaction conditions and catalyst selectivity, simple alcohols such as methanol can be produced directly from light gas and water by the method and system of this disclosure. Oxygen released under the high shear conditions is available to react with other radicals created to produce simple alcohols. From methanol, dimethyl ether may be produced. Dimethyl ether can then be utilized as a fuel either directly or mixed with conventional fuels.

The overall chemistry and the energy balance of the process for light gas comprising carbon dioxide is shown in Formulas 2 through 10. The heat of reactions for formulae 2 through 9 is calculated from the corresponding heats of formation. For a (—$CH_2$—) unit, the heat of formation is calculated as ⅛th of the heat of formation of octane.

$$6H_2O(l) \rightarrow 6H_2(g) + 3O_2(g) \quad 1.710 \text{ kJ Electrical energy} \quad (2)$$

$$H_2O(l) \rightarrow H^+ + OH^- \quad (3)$$

$$2CO_2(g) + 2H_2(g) \rightarrow 2CO(g) + 2H_2O(g) \quad 86.2 \text{ kJ Heat} \quad (4)$$

$$2CO(g) + 4H_2(g) \rightarrow 2CH_3OH(g) \quad -181.6 \text{ kJ Heat} \quad (5)$$

$$2CH_3OH(g) \rightarrow CH_3OCH_3(g) + H_2O(g) \quad -24 \text{ kJ Heat} \quad (6)$$

$$CH_3OCH_3(g) \rightarrow 2(—CH_2—)(g) + H_2O(g) \quad -110 \text{ kJ Heat} \quad (7)$$

$$2CO_2(g) + 2H_2(g) \rightarrow 2O_2(g) + 2(—CH_2—)(l) \quad -229 \text{ kJ Heat balance} \quad (8)$$

$$4H_2O(g) \rightarrow 4H_2O(l) \quad -176 \text{ kJ Heat of condensation} \quad (9)$$

$$2H_2O(l) + 2CO_2(g) \rightarrow 3O_2(g) + 2(—CH_2—)(l) \quad 1305 \text{ kJ Energy balance} \quad (10)$$

Without wishing to be limited by theory, formula 8 shows the balanced equation of all the reactions which are believed to occur after the deoxygenating of $CO_2$ step, i.e., steps 4-7, and the total amount of hydrocarbon generated. Formula 9 shows the heat of condensation for the produced water that may be recycled in the process. The overall chemical balance for steps 2-6 and the calculated overall energy consumption of the process is shown in Formula 10.

Vessel/reactor 10 may be operated in either continuous or semi-continuous flow mode, or it may be operated in batch mode. The contents of vessel 10 may be maintained at a specified reaction temperature using heating and/or cooling capabilities (e.g., heater H1) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents may be stirred continuously or semi-continuously with, for example stirring system 31.

In embodiments, at least a portion of the reaction mixture in line 16 comprising liquid medium, liquid product, and optional catalyst is recirculated to HSD 40 for multi-pass operation. Line 16 may be fluidly connected to line 21 by line 20, for recycle of at least a portion of line 16 to HSD 40. As shown in FIG. 1, heat transfer device H2 may serve to control the temperature of line 21.

Unreacted light gas along with any other gas in vessel 10 may exit vessel 10 via gas line 17. As shown in FIG. 1, in embodiments, gas recovered from the vessel 10 headspace may be passed through a condenser 30. Extraction of reactor gas from vessel 10 may be aided by, for example, compressor 50. Condenser 30 may comprise a cooling coil and cold trap. Non condensed gases from condenser 30 may be introduced via line 25 to a compressor 50. Compressed gas may be recycled via, for example, line 15. Line 15 may introduce compressed material from compressor 50 injected into HSD 40, independently, or into line 13, line 22, and/or line 23. Condensed liquid product 24 exiting condenser 30 is extracted from the system. Condensed liquid in line 24 comprises reaction products that may be utilized by any means known in the art, for example sale thereof or conversion into various other chemical products.

Temperature. In some embodiments, use of the disclosed process comprising reactant mixing via external high shear device 40 permits conversion of light gas to organic product comprising oxygenates, hydrocarbons, or a combination thereof. The temperature within high shear device 40 is desirably below the flash point of the liquid medium. In embodiments, the reaction temperature is less than 220° C. In some embodiments, operating conditions comprise a temperature in the range of from about 100° C. to about 230° C. In some embodiments, the temperature is in the range of about 30° C.

to about 40° C. In some embodiments, the temperature is in the range of from about 160° C. to 180° C. In some specific embodiments, the reaction temperature is in the range of from about 155° C. to about 160° C. In embodiments, the product profile changes with temperature in vessel 10, and the reactor temperature may be adjusted to attain the desired product profile. At increased temperatures, a greater quantity of lower molecular weight materials may be produced, while, at lower temperatures, a greater quantity of higher molecular weight materials may be produced.

Pressure. In some embodiments, the reaction pressure in vessel 10 is in the range of from about 202.65 kPa (2 atm) to about 5.6 MPa-6.1 MPa (55-60 atm). In some embodiments, reaction pressure is in the range of from about 810.6 kPa to about 1.5 MPa (8 atm to about 15 atm). In embodiments, vessel 10 is operated at or near atmospheric pressure. In embodiments, reaction pressure is less than about 6895 kPa (1000 psi). Alternatively, in some embodiments, the operating pressure is less than about 3445 kPa (500 psi). In some embodiments, the operating pressure is less than about 3100 kPa (450 psi). In some embodiments, the operating pressure is less than about 1030 kPa (150 psi).

In some instances, it is desirable to further enhance the degree of light gas conversion. Increasing reaction pressure increases reaction rate, but also increases wear of the materials constituting the reactors, the piping, and the mechanical parts of the plant, as well as the ancillary devices. The superior dissolution and/or dispersion provided by the external high shear mixing may allow a decrease in operating pressure while maintaining or even increasing product production.

Multiple Pass Operation. As shown in FIG. 1, it may be desirable to pass the contents of vessel 10, or a fraction thereof, through HSD 40 during a second pass. In this case, line 16 may be connected to line 21 as indicated, such that at least a portion of the contents of line 16 is recycled from vessel 10 and pumped by pump 5 into line 13 and thence into HSD 40. Additional light gas may be injected into line 13, or may be added directly into the high shear device (not shown). In other embodiments, product in line 16 may be further treated (for example, liquid product removed therefrom) prior to recycle of a portion of the liquid in line 16 to high shear device 40. In some embodiments it may be desirable to pass the liquid medium and dispersible gas comprising carbon dioxide and/or alkane through high shear device 40 and then add optional catalyst into line 13 during a second pass through HSD 40.

Multiple High Shear Mixing Devices. In some embodiments, two or more high shear devices like HSD 40, or configured differently, are aligned in series, and are used to further enhance the reaction. Their operation may be in either batch or continuous mode. In some instances in which a single pass or "once through" process is desired, the use of multiple high shear devices in series may be advantageous. For example, in embodiments, outlet dispersion in line 18 may be fed into a second high shear device. When multiple high shear devices 40 are operated in series, additional light gas may be injected into the inlet feedstream of each device. Although generally less desirable, in embodiments where multiple high shear devices 40 are operated in series, vessel 10 may be omitted. In some embodiments, multiple high shear devices 40 are operated in parallel, and the outlet dispersions therefrom are introduced into one or more vessel 10.

Product/Downstream Processing. Gas is removed from vessel 10 via gas outlet line 17. The gas in line 17 may comprise unreacted light gas, $H_2$, as well as oxygenate and/or hydrocarbon product. Gas removed via reactor gas outlet 17 may be further treated and its components recycled. For example, cold trap 30 may be used to condense and remove from gas line 17 any product oxygenate and/or hydrocarbon that escapes vessel 10 in recycle gas line 17. Condensate stream exiting condenser 30 via line 24 may comprise primarily alcohols. In embodiments, the liquid product condensate stream in line 24 comprises methanol. In embodiments, liquid product condensate stream in line 24 comprises greater than 50% methanol. In embodiments, liquid product condensate stream in line 24 comprises greater than 65% methanol. In embodiments, liquid product condensate stream in line 24 comprises about 68% methanol. In embodiments, methanol and carbon dioxide are converted into organic oxygenate product comprising ethanol.

In some applications, the unconverted light gas removed from cold trap 30 via line 25 is recovered and injected (directly or indirectly) back into high shear device 40.

A portion of product in line 16 may be removed from vessel 10. Organic product in line 16 comprises liquid oxygenates, hydrocarbons, or a combination thereof in addition to liquid medium. The product stream may comprise primarily hydrocarbons produced during reaction along with liquid medium. For example, in embodiments, product in line 16 comprises hydrocarbons in polyethylene glycol. In applications where ethane, butane, propane, and pentane are present in the light gas, the resulting product in line 16 may comprise product having a higher carbon number than when methane and carbon dioxide are utilized. In such instances, the product removed via line 16 may comprise greater amounts of mixed oxygenates and aldehydes.

The liquid product comprising oxygenate and/or hydrocarbon recovered from product line 16 and/or condensate line 24 may then be used as a fuel or utilized as a feed stock to another chemical processes, as known to those of skill in the art. For instance, methanol produced by the process may serve as a feed to a process for making formaldehyde.

Enhanced Oil Recovery with Liquids Produced from Methane. Low API (viscous) oil is often difficult to recover due to poor flow properties. Various techniques are used today to help recover low API oil including $CO_2$, steam and water injection. In drilling for oil, the natural gas from the well is often used to re-pressurize the well in order to enhance oil recovery. Natural gas injection, however, may do little to help recover low API oil that is difficult to move in the well space.

The disclosed system and method may be used in the recovery of petroleum crude oil from oil wells, and may be particularly useful for enhancing recovery of oil (e.g., heavy oil) downhole. Methane gas may be converted to liquids in situ at a well site via the disclosed system and methods and used for enhanced oil recovery.

In an embodiment according to this disclosure, natural gas (comprising methane) either from a well head or otherwise available is converted by the disclosed system and method into liquids that are injected into the well to enhance the recovery of heavier oil deposits therein.

In embodiments, organic oxygenates and other liquid product produced from gas comprising methane and exiting system 100 in line 16 and/or 24 is utilized for enhanced oil recovery. System 100 may be assembled on mobile skid mounted units. Such units may permit gas conversion at remote locations, and excess gas may be flared. Larger units may be used where larger deposits of heavy crude are to be recovered.

Conversion of Light Gas. In embodiments, greater than about 80% of the light gas is converted into product via the disclosed method, and any remaining unconverted light gas is present in the reactor headspace and/or is dissolved in the liquid product. In some embodiments, greater than about 90% of the light gas is converted into organic product. In some embodiments, substantially all of the light gas is converted to product. In embodiments, substantially all of the light gas is converted into product via multi-pass operation of a closed loop system.

In some embodiments, light gas comprises carbon dioxide, and the conversion of carbon dioxide is greater than about 60%. In embodiments, light gas comprises carbon dioxide and the conversion of carbon dioxide, is greater than about 80%. In embodiments, light gas comprises carbon dioxide and the conversion of carbon dioxide, is greater than about 90%. In embodiments, a closed loop system is used, and substantially all of the carbon dioxide fed in dispersible gas via lines 22 and/or 23 is converted to product.

In embodiments, light gas comprises methane and the conversion of methane, is greater than about 60%. In embodiments, light gas comprises methane and the conversion of methane, is greater than about 80%. In embodiments, light gas comprises methane and the conversion of methane, is greater than about 90%. In embodiments, a closed loop system is used, and substantially all of the methane fed into high shear system 100 is converted to product. In certain embodiments, the yield of organic oxygenates is greater than that of hydrocarbon. In embodiments, the yield of organic oxygenates is greater than about 50%. In some embodiments, the yield of oxygenates is greater than about 70%.

Features. The increased surface area of the micrometer sized and/or submicrometer sized light gas bubbles in the dispersion in line 18 produced within high shear device 40 results in faster and/or more complete conversion of light gas. As mentioned hereinabove, additional benefits are the ability to operate vessel 10 at lower temperatures and pressures resulting in both operating and capital cost savings. The benefits of the present invention include, but are not limited to, faster cycle times, increased throughput, reduced operating costs and/or reduced capital expense due to the possibility of designing smaller reactors, and/or operating the reactor at lower temperature and/or pressure and the possible reduction in catalyst.

The application of enhanced mixing of the reactants by HSD 40 potentially permits significant production of organic product from light gas. In some embodiments, the enhanced mixing potentiates an increase in throughput of the process stream. In some embodiments, the high shear mixing device is incorporated into an established process, thereby enabling an increase in production (i.e., greater throughput). In contrast to some methods that attempt to increase the degree of conversion by simply increasing reactor pressures, the superior dispersion and contact provided by external high shear mixing may allow in many cases a decrease in overall operating pressure while maintaining or even increasing product production.

Without wishing to be limited to a particular theory, it is believed that the level or degree of high shear mixing is sufficient to increase rates of mass transfer and also produces localized non-ideal conditions that permit reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," Current Science 91 (No. 1): 35-46 (2006). Under such non-ideal conditions, carbon dioxide and/or alkane may be dissociated; and water and/or simple alkane molecules converted into free radicals. The free radicals are then allowed to reform into hydrocarbons and oxygenates. In HSD 40, alkane is dehydrogenated and/or carbon dioxide decoupled potentially with the aid of at least one suitable catalyst to form reactive radical compounds. The disclosed system and method may provide for substantially emissions-free conversion of light gas to valuable product(s) by conversion under non-ideal conditions provided by the use of high shear.

In some embodiments, the system and methods described herein permit design of a smaller and/or less capital intensive process than previously possible without the use of external high shear device 40. Potential advantages of certain embodiments of the disclosed methods are reduced operating costs and increased production from an existing process.

Representative data obtained via an embodiment of the disclosed system and method is presented as Examples 1-5 hereinbelow.

EXAMPLES

Example 1

Catalyst Preparation Method

Catalyst MR-34-18 in Table 1 hereinabove was prepared in a 500 mL beaker, using 9 grams ammonium tungstate (99.9% purity from Sigma-Aldrich Co., St. Louis, Mo.) and) and 1 g lanthanum nitrate (Fisher Chemicals, Co., Fair Lawn, N.J.) that were dissolved in 200 mL deionized water at 70-80° C. In a separate beaker cobalt (II) nitrate hexahydrate (from Sigma-Aldrich Co. 99% purity) was dissolved in water at 70° C. The two dissolved salt solutions were then combined and 30 g of manganese (IV) oxide (reagent plus purity, 99% from Aldrich) added with 10 mL ammonium hydroxide (A.C.S. reagent grade from Sigma-Aldrich Co.) to achieve an alkaline pH. The mixture was heated at 80° C. and the paste formed was transferred to a glass plate and heated for 2-3 hours in an oven maintained at 120° C., which caused the formation of a coat or thin layer on the manganese oxide.

The dried catalyst was placed a crucible for calcination. The calcination furnace was continually purged with atmospheric air during calcination. The furnace was initially set to 300° C. for thirty minutes and then ramped to 550° C. and held for 2 hours. Then furnace temperature was ramped to 860° C. and held for 24 hours. The furnace was then cooled to room temperature and removed from the furnace. The catalyst was crushed in a mortar and pressed at 7 tons and sized to fit through a screen # 10 sieve (approximately 2 microns and 0.0661 inches). The granules were then annealed under inert conditions at 1000° C. for 8 hours. Following cooling to room temperature, the catalyst was ready for use in the reactor.

An XRD of the catalyst MR-34-18 revealed the following metal oxides present: $Mn_2O_3=MnO+MnO_2$; $Na_2WO_4=Na_2O+WO_3$; $MnWO_4=MnO+WO_3$; and $CoMn_2O_4=CoO+MnO_2$.

Other phases have also been identified such as $MnWO_4$ and perhaps $Na_2WO_4$. Other raw materials were used to produce catalyst having the compositions (i.e. atomic ratios) shown in Table 1. These include ammonium heptamolybdate [$(NH_4)_6Mo_7O_{24}.4H_2O$], also referred to as ammonium molybdate tetrahydrate.

Examples 2-4

Methane Conversion

An experiment was performed over 36 days to evaluate the production of oxygenates and liquid hydrocarbons via the disclosed system and method. The experiment log for the testing is provided herein as Appendix A. The temperature of vessel 10 during the experiment ran between 150° C. when started to about 80° C. on the last day of the experiment. The power meter consumption at 7500 RPM was 0.15 KW/h when the vessel 10 temperature was 80-100° C. During start-up of cold trap 30, the power consumption was 0.17 KW/h. When the temperature reached 146° C., power consumption dropped to 0.14 KW/h. At maximum shear of 104 Hz (13500 RPM) on high shear device 40, the power consumption on cold PEG was 0.27 KW/h. When the temperature was between about 80° C. and 100° C., the power consumption was 0.24-0.25 KW/h. Throughout the experiments of Examples 2-5, the gas mixture was 345 kPa (50 psig) and comprised a 2:1 volume ratio of methane:carbon dioxide, unless stated otherwise. The best conversion of light gas was observed at vessel 10 temperatures of between about 85° C. and 90° C.

Example 2

High Shear Reaction of 2:1 Methane:Carbon Dioxide with Ruthenium Carbonyl

A cold trap was positioned within system 100 as shown in FIG. 1. Five (5) grams of tri-ruthenium carbonyl was dissolved at 125° C. in ½ L of PEG. This ruthenium carbonyl/PEG was added to 1 L PEG. Three hours after initiation of the test, ruthenium carbonyl/PEG solution was injected into vessel 10 for a period of one hour.

Liquid product MBM-33-B (Liquid) was recovered from cold trap liquid 24 and analyzed for glycols. The results are presented in Table 2.

TABLE 2

MBM 33B (Liquid)

| Test Method | Component | Amount, mg/L |
|---|---|---|
| SW-846 8015D Non Purgeable Organic Compounds | Ethanol | 484 |
| | Methanol | 4637 |
| | n-Propyl Alcohol | 44.7 |
| | t-Butyl Alcohol | 7.08 |
| SW-846 8015M Glycols | Ethylene Glycol | 27264 |
| | Diethylene Glycol | 68170 |
| | Triethylene Glycol | 123207 |
| | Tetraethylene glycol | 142359 |
| SW-846 8260B Volatile Organic Compounds | 1,2,4-Trimethylbenzene | 0.826 |
| | 1,3,5-Trimethylbenzene | 0.574 |
| | Ethylbenzene | 0.193 |
| | m- & p- Xylenes | 1.04 |
| | MEK | 18.6 |
| | Naphthalene | 0.601 |
| | n-Butylbenzene | 0.143 |
| | o-Xylene | 0.570 |
| | Xylenes | 1.61 |
| TX 1005 Total Petroleum Hydrocarbons | $C_6$-$C_{12}$ | 407 |
| | >C12-C28 | 343 |
| | >C28-C35 | BRL* |
| | Total C6-C35 | 750 |
| TX 1006 Total Petroleum Hydrocarbons | Aliphatic (>C06-C08) | BRL |
| | Aliphatic (>C08-C10) | BRL |
| | Aliphatic (>C10-C12) | BRL |
| | Aliphatic (>C12-C16) | 139.656 |
| | Aliphatic (>C16-C21) | 53.404 |
| | Aliphatic (>C21-C35) | BRL |
| | Aromatic (C06-C08) | BRL |
| | Aromatic (C08-C10) | 478.062 |
| | Aromatic (C10-C12) | 54.089 |
| | Aromatic (C12-C16) | 50.074 |
| | Aromatic (C16-C21) | 61.368 |
| | Aromatic (C21-C35) | BRL |

*BRL: Below Recordable Limits

Example 3

High Shear Reaction of 2:1 Methane:Carbon Dioxide with Ruthenium Carbonyl

Sample MBM 34-2 was taken from cold trap gas 25, sample 34-1 from vessel 10 product liquid 16, and sample 34-PEG was a sample of virgin polyethylene glycol. The results were analyzed for hydrocarbons and glycols, and the results are presented in Table 3.

TABLE 3

MBM 34-1, MBM 34-2, and MBM 34 PEG

| Test Method | Component | MBM 34-1 Reactor Liquid | MBM 34-2 Cold Trap Gas | MBM 34-PEG Virgin PEG |
|---|---|---|---|---|
| EPA TO-15 Volatile Organic Compounds in Air by GCMS, nL | Benzene | — | 2.72 | — |
| | Toluene | — | 3.51 | — |
| | Ethylbenzene | — | 7.55 | — |
| | m- & p- Xylenes | — | 8.81 | — |
| | Styrene | — | 1.09 | — |
| | o-Xylene | — | 9.17 | — |
| | 1,3,5-Trimethylbenzene | — | 2.68 | — |
| | 1,2,4-Trimethylbenzene | — | 5.74 | — |
| SW-846 8015D Non Purgeable Organic Compounds, mg/kg | Ethanol | BRL* | — | BRL |
| | Methanol | BRL | — | BRL |
| | n-Propyl Alcohol | BRL | — | BRL |
| | t-Butyl Alcohol | BRL | — | BRL |

TABLE 3-continued

MBM 34-1, MBM 34-2, and MBM 34 PEG

| Test Method | Component | MBM 34-1 Reactor Liquid | MBM 34-2 Cold Trap Gas | MBM 34-PEG Virgin PEG |
|---|---|---|---|---|
| SW-846 8015M Glycols, mg/kg | Ethylene Glycol | 2780 | — | BRL |
| | Diethylene Glycol | 27216 | — | 27353 |
| | Triethylene Glycol | 152328 | — | 165424 |
| | Tetraethylene glycol | 402944 | — | 430688 |
| SW-846 8260B Volatile Organic Compounds, mg/kg | 1,2,4-Trimethylbenzene | 0.460 | — | 0.163 |
| | 1,3,5-Trimethylbenzene | 0.128 | — | 0.097 |
| | Ethylbenzene | 0.139 | — | 0.329 |
| | m- & p- Xylenes | 0.574 | — | 0.509 |
| | MEK | 0.210 | — | 0.490 |
| | Naphthalene | BRL | — | BRL |
| | n-Butylbenzene | BRL | — | BRL |
| | n-Propylbenzene | — | — | 0.059 |
| | o-Xylene | 0.249 | — | 0.097 |
| | Xylenes | — | — | — |
| | Toluene | 0.131 | — | 0.701 |
| TX 1005 Total Petroleum Hydrocarbons, mg/kg | $C_6$-$C_{12}$ | 1457 | — | 497 |
| | >C12-C28 | 3531 | — | 1950 |
| | >C28-C35 | BRL | — | BRL |
| | Total C6-C35 | 4988 | — | 2447 |
| TX 1006 Total Petroleum Hydrocarbons, mg/kg | Aliphatic (>C12-C16) | BRL | — | BRL |
| | Aliphatic (>C16-C21) | BRL | — | BRL |
| | Aromatic (C8-C10) | 342.049 | — | 339.020 |
| | Aromatic (C10-C12) | 1569.564 | — | 1229.302 |
| | Aromatic (C12-C16) | 994.041 | — | 866.937 |
| | Aromatic (C16-C21) | 1566.368 | — | BRL |

*BRL: Below Recordable Limits

Samples MBM-34D and MBM-34F were taken from the cold trap liquid 24, as described in Appendix A attached herewith. The results of the analysis thereof are presented in Table 4.

TABLE 4

MBM 34-1, MBM 34-2, and MBM 34

| Test Method | Component | MBM 34-D Cold Trap | MBM 34-F Cold Trap |
|---|---|---|---|
| SW-846 8015D Non Purgeable Organic Compounds, mg/L | Ethanol | 146 | 125 |
| | Methanol | 2020 | 2884 |
| | n-Propyl Alcohol | 13.9 | 20.9 |
| | t-Butyl Alcohol | BRL* | BRL |
| SW-846 8015M Glycols, mg/L | Ethylene Glycol | 11363 | 13147 |
| | Diethylene Glycol | 34752 | 31944 |
| | Triethylene Glycol | 51417 | 54701 |
| | Tetraethylene glycol | 64274 | 104596 |
| SW-846 8260B Volatile Organic Compounds, mg/L | 1,2,4-Trimethylbenzene | 0.258 | BRL |
| | 1,3,5-Trimethylbenzene | BRL | BRL |
| | Ethylbenzene | BRL | BRL |
| | m- & p- Xylenes | 0.260 | BRL |
| | MEK | 11.6 | 4.29 |
| | Naphthalene | 0.156 | BRL |
| | n-Butylbenzene | BRL | BRL |
| | n-Propylbenzene | BRL | BRL |
| | o-Xylene | 0.142 | BRL |
| | Xylenes | 0.402 | BRL |
| | Toluene | BRL | BRL |
| TX 1005 Total Petroleum Hydrocarbons, mg/L | $C_6$-$C_{12}$ | 231 | 354 |
| | >C12-C28 | 116 | 3156 |
| | >C28-C35 | BRL | BRL |
| | Total C6-C35 | 347.583 | 3510 |
| TX 1006 Total Petroleum Hydrocarbons, mg/L | Aliphatic (>C6-C8) | BRL | BRL |
| | Aliphatic (>C8-C10) | BRL | BRL |
| | Aliphatic (>C10-C12) | BRL | BRL |
| | Aliphatic (>C12-C16) | 54.754 | 1447.8 |
| | Aliphatic (>C16-C21) | 36.737 | 774.1 |
| | Aliphatic (>C21-C35) | BRL | 533.8 |
| | Aromatic (C6-C8) | BRL | BRL |
| | Aromatic (C8-C10) | 112.049 | BRL |

TABLE 4-continued

MBM 34-1, MBM 34-2, and MBM 34

| Test Method | Component | MBM 34-D Cold Trap | MBM 34-F Cold Trap |
|---|---|---|---|
| | Aromatic (C10-C12) | 37.385 | BRL |
| | Aromatic (C12-C16) | 35.599 | 251.4 |
| | Aromatic (C16-C21) | 47.699 | 403.0 |
| | Aromatic (C21-C35) | BRL | BRL |

*BRL: Below Recordable Limits

Example 4

High Shear Reaction of 2:1 Methane:Carbon Dioxide and Methane Alone in Paraffinic Oil with Palladium Silica Catalyst Samples MBM-35B Water and 35-TagA Water were taken from the cold trap 24 as indicated in Appendix A hereinbelow. The results of the analysis thereof are presented in Table 5.

TABLE 5

MBM 35-B Water and MBM 35-TagA Water

| Test Method | Component | MBM 35-B Cold Cold Trap Liquid | MBM 35-TagA Cold Trap Liquid |
|---|---|---|---|
| SW-846 8015D Non-Purgeable Organic Compounds, mg/L | 2-Propanol | BRL* | BRL |
| | Ethanol | 2648 | 2036 |
| | Isobutyl Alcohol | 66.9 | 41.4 |
| | Methanol | 1147 | 1602 |
| | n-Butanol | 881 | 828 |
| | n-Propyl Alcohol | 1488 | 1180 |
| | sec-Butyl Alcohol | 474 | 447 |
| | t-Butyl Alcohol | 58.4 | 72.5 |
| SW-846 8015M Glycols, mg/L | Ethylene Glycol | 2761 | 2846 |
| | Diethylene Glycol | 2842 | 4747 |
| | Triethylene Glycol | 2568 | 4367 |
| | Tetraethylene glycol | 774 | 1644 |
| SW-846 8260B Volatile Organic Compounds, mg/L | 1,2,4-Trimethylbenzene | BRL | BRL |
| | 1,3,5-Trimethylbenzene | BRL | BRL |
| | Ethylbenzene | BRL | BRL |
| | m- & p- Xylenes | BRL | BRL |
| | MEK | 386 | 783 |
| | Naphthalene | BRL | BRL |
| | n-Butylbenzene | BRL | BRL |
| | n-Propylbenzene | BRL | BRL |
| | o-Xylene | BRL | BRL |
| | Xylenes | BRL | BRL |
| | Toluene | BRL | BRL |
| TX 1005 Total Petroleum Hydrocarbons, mg/L | $C_6$-$C_{12}$ | 1556 | 1255 |
| | >C12-C28 | 3655 | 2460 |
| | >C28-C35 | 931 | 1418 |
| | Total C6-C35 | 6142 | 5133 |
| TX 1006 Total Petroleum Hydrocarbons, mg/L | Aliphatic (>C6-C8) | BRL | BRL |
| | Aliphatic (>C8-C10) | 38.4 | 61.7 |
| | Aliphatic (>C10-C12) | 92.2 | 121.7 |
| | Aliphatic (>C12-C16) | 549.3 | 387.7 |
| | Aliphatic (>C16-C21) | 733.7 | 561.9 |
| | Aliphatic (>C21-C35) | 3281.5 | 3759.2 |
| | Aromatic (C6-C8) | 456.5 | 414.8 |
| | Aromatic (C8-C10) | 617.1 | 321 |
| | Aromatic (C10-C12) | 690.8 | 248 |
| | Aromatic (C12-C16) | 701.4 | 118.6 |
| | Aromatic (C16-C21) | 162.5 | BRL |
| | Aromatic (C21-C35) | 87.7 | BRL |

*BRL: Below Recordable Limits

Samples MBM-35B Oil and MBM-35TagA Oil both were taken from vessel 10 liquid, as indicated in Appendix A attached herewith. The results of the analysis thereof are presented in Table 6.

TABLE 6

MBM 35-B Oil and MBM 35-TagA Oil

| Test Method | Component | MBM 35-B Oil- Vessel 10 Liquid | MBM 35-TagA Oil Vessel 10 Liquid |
|---|---|---|---|
| SW-846 8015D Non-Purgeable Organic Compounds, mg/kg | 2-Propanol | BRL* | BRL |
| | Ethanol | 450 | 202 |
| | Isobutyl Alcohol | 71.8 | 38.9 |
| | Methanol | 132 | 173 |
| | n-Butanol | 1611 | 818 |
| | n-Propyl Alcohol | 867 | 378 |
| | sec-Butyl Alcohol | 361 | 174 |
| | t-Butyl Alcohol | BRL | BRL |
| SW-846 8015M Glycols, mg/kg | Ethylene Glycol | BRL | BRL |
| | Diethylene Glycol | BRL | BRL |
| | Triethylene Glycol | BRL | BRL |
| | Tetraethylene glycol | BRL | BRL |
| SW-846 8260B Volatile Organic Compounds, mg/kg | 1,2,4-Trimethylbenzene | BRL | BRL |
| | 1,3,5-Trimethylbenzene | BRL | BRL |
| | Ethylbenzene | BRL | BRL |
| | m- & p-Xylenes | BRL | BRL |
| | MEK | 462 | 545 |
| | Naphthalene | BRL | BRL |
| | n-Butylbenzene | BRL | BRL |
| | n-Propylbenzene | BRL | BRL |
| | o-Xylene | BRL | BRL |
| | Xylenes | BRL | BRL |
| | Toluene | BRL | BRL |
| TX 1005 Total Petroleum Hydrocarbons, mg/kg | $C_6-C_{12}$ | 160598 | 19135 |
| | >C12-C28 | 534858 | 60488 |
| | >C28-C35 | 128928 | 47059 |
| | Total C6-C35 | 824384 | 126682 |
| TX 1006 Total Petroleum Hydrocarbons, mg/kg | Aliphatic (>C6-C8) | BRL | BRL |
| | Aliphatic (>C8-C10) | 14144 | BRL |
| | Aliphatic (>C10-C12) | 24985 | 3160.8 |
| | Aliphatic (>C12-C16) | 78792 | 8115.5 |
| | Aliphatic (>C16-C21) | 100170 | 11078.6 |
| | Aliphatic (>C21-C35) | 484242 | 78233.2 |
| | Aromatic (C06-C08) | 15842 | 10369.9 |
| | Aromatic (C08-C10) | 55048 | 11291.5 |
| | Aromatic (C10-C12) | 67800 | 8445.2 |
| | Aromatic (C12-C16) | 73365 | 6187.8 |
| | Aromatic (C16-C21) | 25389 | 3866.2 |
| | Aromatic (C21-C35) | BRL | BRL |

*BRL: Below Recordable Limits

Example 5

High Shear Ethane Conversion

For this example, the same equipment configuration as used in examples 2-4 was utilized. The agitator on vessel 10 was operated at 1000 RPM. The High Shear unit 40 was operated at 13,500 RPM. The vessel 10 was held at 150° C. and 345 kPa (50 psi).

Six liters of melted polyethylene glycol having a number average molecular weight, $M_n$, of 850-950 (Sigma Aldrich) was placed in vessel 10 along with 2 kilograms of Palladium Catalyst (0.5 wt. % Pd on $SiO_2$) and 5 grams of Triruthenium Dodecacarbonyl (Sigma Aldrich). All 3 heaters (H1, H2, H3), gear pump 5 and HSD 40 were turned on.

System 100 was closed and purged with $CO_2$ three times and the gas compressor (extracting gas from the top of vessel 10 to inlet line 22 of HSD 40) was turned on. Gas feed comprising ethane and $CO_2$ at an approximate flow ratio of 2:1 was introduced into top of vessel 10. Similar runs were conducted with and without injection of 1 L of water into vessel 10. After 12 hours, the experiment was terminated and samples were taken from cold trap 30 and analyzed. Results are presented in Table 7, MBM 39-A results are without water injection, and MBM 39-AW are with water injection.

TABLE 7

MBM 39-A and MBM 39-AW Cold Trap Liquid

| Test Method | Component | MBM 39-A | MBM 39-AW |
|---|---|---|---|
| SW-846 8015D Non-Purgeable Organic Compounds, mg/L | 2-Propanol | BRL* | BRL |
| | Ethanol | 3876 | 77.9 |
| | Isobutyl Alcohol | BRL | BRL |
| | Methanol | 3938 | 180 |
| | n-Butanol | BRL | BRL |
| | n-Propyl Alcohol | 339 | BRL |
| | sec-Butyl Alcohol | BRL | BRL |
| | t-Butyl Alcohol | 44.4 | BRL |
| SW-846 8015M Glycols, mg/L | Ethylene Glycol | 2142 | 156 |
| | Diethylene Glycol | 2785 | 94.2 |
| | Triethylene Glycol | 284 | BRL |
| | Tetraethylene glycol | 707 | BRL |
| SW-846 8260B Volatile Organic Compounds, mg/L | MEK | 176 | 4.47 |
| TX 1005 Total Petroleum Hydrocarbons, mg/L | $C_6-C_{12}$ | BRL | 70.1 |
| | >C12-C28 | 14609 | 1031 |
| | >C28-C35 | BRL | BRL |
| | Total C6-C35 | 14609 | 1101.1 |

*BRL: Below Recordable Limits

Example 6

High Shear Propane Conversion

A run with conditions and equipment similar to Example 5 was conducted with propane gas substituted for ethane. Similar runs were conducted with and without injection of 1 L of water into vessel 10. After 12 hours, the experiment was terminated and samples were taken from cold trap 30 and analyzed. Results are presented in Table 8, MBM 39-B results are without water injection, and MBM 39-BW are with water injection.

TABLE 8

MBM 39-B and MBM 39-BW Cold Trap Liquid

| Test Method | Component | MBM 39-B | MBM 39-BW |
|---|---|---|---|
| SW-846 8015D Non-Purgeable Organic Compounds, mg/L | 2-Propanol | BRL* | BRL |
| | Ethanol | 569 | 47.1 |
| | Isobutyl Alcohol | BRL | BRL |
| | Methanol | 5949 | 482 |
| | n-Butanol | BRL | BRL |
| | n-Propyl Alcohol | 96.5 | BRL |
| | sec-Butyl Alcohol | BRL | BRL |
| | t-Butyl Alcohol | BRL | BRL |
| SW-846 8015M Glycols, mg/L | Ethylene Glycol | 15229 | 1282 |
| | Diethylene Glycol | 22270 | 2937 |
| | Triethylene Glycol | 7112 | 2679 |
| | Tetraethylene glycol | 5137 | 1648 |
| SW-846 8260B Volatile Organic Compounds, mg/L | 1,2,4-Trimethylbenzene | 1.38 | BRL |
| | m- & p-Xylenes | 0.606 | BRL |
| | MEK | 19.9 | 53.6 |
| | Methyl Acetate | 3.408 | BRL |
| | Naphthalene | 1.79 | BRL |
| | o-Xylene | 0.527 | BRL |
| | Xylenes | 1.133 | BRL |
| TX 1005 Total Petroleum Hydrocarbons, mg/L | $C_6$-$C_{12}$ | BRL | BRL |
| | >C12-C28 | 22915 | 2351 |
| | >C28-C35 | BRL | BRL |
| | Total C6-C35 | 22915 | 2351 |

*BRL: Below Recordable Limits

Example 7

High Shear Butane Conversion

A run with conditions and equipment similar to Example 5 was conducted with butane gas substituted for ethane. During this run, 1 L of water was injected into vessel 10 to assist in steam stripping of organics present. The analytical results are presented in Table 9.

TABLE 9

MBM 39-CW Cold Trap Liquid

| Test Method | Component | MBM 39-CW |
|---|---|---|
| SW-846 8015D Non-Purgeable Organic Compounds, mg/L | 2-Propanol | BRL* |
| | Ethanol | 117 |
| | Isobutyl Alcohol | BRL |
| | Methanol | 276 |
| | n-Butanol | BRL |
| | n-Propyl Alcohol | 24.0 |
| | sec-Butyl Alcohol | BRL |
| | t-Butyl Alcohol | BRL |
| SW-846 8015M Glycols, mg/L | Ethylene Glycol | BRL |
| | Diethylene Glycol | BRL |
| | Triethylene Glycol | BRL |
| | Tetraethylene glycol | BRL |

TABLE 9-continued

MBM 39-CW Cold Trap Liquid

| Test Method | Component | MBM 39-CW |
|---|---|---|
| SW-846 8260B Volatile Organic Compounds, mg/L | Ethyl Acetate | 18 |
| | Ethylbenzene | 0.462 |
| | MEK | 23.9 |
| | Methyl Acetate | 18.25 |
| | n-Butylbenzene | 0.462 |
| | n-Propylbenzene | 0.343 |
| | o-Xylene | 0.331 |
| | Toluene | 0.755 |
| | Xylenes | 0.331 |
| TX 1005 Total Petroleum Hydrocarbons, mg/L | $C_6$-$C_{12}$ | BRL |
| | >C12-C28 | 3525 |
| | >C28-C35 | BRL |
| | Total C6-C35 | 3525 |

*BRL: Below Recordable Limits

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

APPENDIX A

Experiment Log for Examples 2-4

Day 1: Test with Methane and Oxygen and Little Hydrogen ($CO_2$ and Methane Approximately 1:2 Through Regulators).

7:00 Took 6 liters of Polyethylene Glycol
  Took one liter and added 135 grams of MR 34 in the PEG after crushing MR34 it and added all 6 liters into the vessel/reactor 10. Note added total 5½ liters total
  Saved another 1½ liter for later injection.
7:20 Turn pump 5 on using compressor 50 to pull vacuum on the vessel 10. Purge with oxygen.
7:25 Shear on 0.17 KW/h.

7:35 Temp 51° C. Continue purging with oxygen.
7:40 Leak on top flange on condenser 30. Line shut down.
9:15 Finished repairs. Start pump 5 on line.
9:20 Put 68.9 (10 psig) oxygen in vessel 10. Turn methane on 60° C.
9:27 75° C., 276 kPa (40 psig) pressure on vessel 10.
9:45 Temperature 116° C., 310 kPa (45 psig) on vessel 10. All three heaters, H1, H2, and H3 on.
11:10 Temp 153° C., 345 kPa (50 psig).
11:30 Pull 3 bags gas sample MBM-32-1. Temperature 185° C., 172 kPa (25 psig).
11:35 Cut one heater off. Temperature 192° C., 345 kPa (50 psig).
12:00 Test is changed now to inject $CO_2$ and methane gas only. Temp 168° C., pressure 0 kPa (0 psig).
PM Start injecting mixture with Ru Carbonyl.
12:00 Took sample MBM-32B (before Ru Carbonyl)
12:00 Took fresh polyethylene glycol 800 mL and add 5 grams Ru Carbonyl and heat it to 125° C. to dissolve it. Then inject it into the reactor and flush it with 800 mL fresh polyethylene glycol. Inject into reactor over 1 hour.
1:00 Finished injecting Ru Carbonyl. Start putting $CO_2$+Methane into the reactor.
1:00 148° C., 0 kPa (0 psig) on vessel 10. 2 heaters on.
Sample methane oxygen MBM-32-A. 1½ hour sample.
2:10 Temp 141° C., 276 kPa (40 psig). 2 heaters on.
3:10 Pull sample MBM-32 C.
Temp 146° C., 345 kPa (50 psig) on vessel 10.
It takes 4½ min for pressure to go from 414 kPa-276 kPa (60-40 psig),
8:00 Cut Heaters off. Temp 150° C., 414 kPa (60 psig).
8:25 Temperature 112° C., 345 kPa (50 psig). 0.14 KW/h.
Day 2: MBM-33: Continuation of MBM-32 Except Add in-Line Condenser 30 from Vessel 10 to Condenser Before Compressor 50 Inlet
9:30 Pump 5, Shear Device, Mixer 31 in line. Temperature 39° C. All 3 heaters on. Power 0.16 KW/h.
9:40 Put 5(10 pound) bags of ice into the condenser 30 (drum) submerged.
9:48 Temperature 77° C., Pressure 379 kPa (55 psig).
11:00 Verified Liquid in the Knock Out Pot.
11:00 Temperature 95° C., 1 heater on.
Checked boiling point polyethylene glycol.
>200° C. Raise heat—turn all three heaters on.
12:30 Temperature 146° C., pressure 345 kPa (50 psig), 0.15 KW/h.
Pull gas sample MBM-33-1 Tag
12:45 Pull liquid sample from cold trap.
MBM-33-A. Send to Lab
2:45 Temperature 146° C., pressure 345 kPa (50 psig), 0.14 KW/h, 2 heaters on.
Send sample MBM-33-B to lab from cold trap.
3:30 Temperature 126° C., pressure 345 kPa (50 psig), 0.15 KW/h.
Pull reactor sample MBM-33-C.
MBM-33-B sample for Dr. Anthony.
8:30 Shut down for Day 2.
Day 3: MBM-34 Continue MBM-33
8:35 Start up with $CO_2$+Methane.
Temperature 26° C. Start up 0 kPa (0 psig) on vessel 10, 0.16 KW/h.
12:00 Temperature 150° C. Pull sample of liquid for lab.
3:55 Shut down. Temperature 109° C., pressure 345 kPa (50 psig).
Day 6: Continue MBM-34 on Monday
7:25 Turn pump 5 on, shear 40 on, put ice in cold trap 30. Power 0.17 KW/h.
AM 13.8 kPa (2 psig) on vessel 10, temperature 18° C.
All three heaters on. Continue with $CO_2$+Hydrogen injection.
8:00 Temperature 102° C., pressure 345 kPa (50 psig), 0.15 KW/h. Still heating up. All 3 heaters on.
9:00 Reached optimum temperature 150° C., pressure 345 kPa (50 psig), 0.15 KW/h.
Note 2½ heaters on to maintain 150° C.
1:25 Temperature 15° C., pressure 345 kPa (50 psig), 0.14 KW/h.
PM Pull sample from cold trap before water injection.
Tag MBM-34-B before water.
Start injecting water, very low rate, to see the effect.
1:30 1850 mL water in the beaker.
2:01 1799 mL water in the beaker.
51 mL consumed.
3:30 Shut down. Temperature 120° C.
Day 7: Continue MBM-34 with $CO_2$+Methane
Feed Today $H_2O$, Methane, $CO_2$
7:00 Temperature 78° C. Start water injection 1600 mL in beaker.
7:10 Temperature 79° C. Power 0.15 KW/h.
10:40 No Heaters on. Temperature 79° C., pressure 345 kPa (50 psig), 900 mL water left in beaker. Power 0.15 KW/h
1:00 PM Total water 1400 mL, pump quit, turn heat on to make sure water is out.
1:25 Temperature 132° C. Took 500 mL liquid out. Power 0.14 KW/h. Pressure 345 kPa (50 psig).
150 mL sample labeled—Tag MBM-34-D from cold trap liquid.
2:30 Temperature 158° C., pressure 345 kPa (50 psig), ice melted, cut heaters off.
Day 8: Continued MBM-34
AM Add 3½ liters of polyethylene glycol—inject it into the vessel 10 line 3.
Add extra 90° ells to top of vessel 10 to act as a baffle to reduce glycol carryover into cold trap 30.
9:15 Turn pump 5 on, shear 40 on, 60 Hz. Purge all lines with $CO_2$ through reactor inlet 3.
9:25 Turn Heaters H1, H2, H3 on—target temperature 100° C., pressure 345 kPa (50 psig). Power 0.16 KW/h. Temperature 21° C., pressure 345 kPa (50 psig).
10:55 Injecting Polyethylene Glycol at 900 mL per hour.
Note 1. Send virgin P.E glycol to lab.
2. Gas sample MBM 34-2.
3. Reactor sample MBM 34-1
11:15 Temperature 102° C., pressure 345 kPa (50 psig), power 0.15 KW/h. Only 1 heater on.
2:00 Temperature 100° C., pressure 345 kPa (50 psig), power 0.15 KW/h.
Empty cold trap 30—tag MBM-34-E
Day 9 Continue MBM-34
7:10 Start pump 5, shear 40 & compressor 50.
AM Temperature 19° C.
7:50 Temperature 98° C., pressure 345 kPa (50 psig), 1½ heaters on. Power meter 0.15 KW/h. 283 kPa (41 psig) on cold trap 30.
1:30 Temperature 98° C., pressure 352 kPa (51 psig), 1½ heater on. Power meter 0.15 KW/h.
PM
3:30 Shut down.
Day 12: Continue MBM-34: in Crease Shear Above 60 Hertz
8:00 AM On line shear power 0.16 KW/h at 60 Hz.
9:40 Temperature 100° C. 60 Hz increasing to 104 Hz, 0.15 KW/h, pressure 345 kPa (50 psig).
9:45 104 Hz on shear 40. Power 0.15 KW/h.
Note Power Meter 0.26 KW/h at 104 Hz.

10:20 104 Hz, 0.25 KW/h, temperature 95° C., pressure 345 kPa (50 psig).
10:30 95 degrees C., 0.24 KW/h, 104 Hz, 345 kPa (50 psig) on reactor, 289.6 kPa (42 psig) on cold trap
12:00 Power 0.24 KW/h, reactor pressure 345 kPa (50 psig), temperature 95° C., 282.7 kPa (41 PM psig) on cold trap 30.
3:10 A little over 1 heater, temperature 95° C., power 0.23 KW/h, reactor pressure 345 kPa (50 psig).
3:30 Shut down.
Day 13: Continue MBM-34
7:05 Turn system on—shear 40 at Max 104 Hz, pump 5 on, mixer 31 on, vessel 10 temperature 25° C., pressure 137.9 kPa (20 psig).
AM Gas on $CO_2$+Methane. Power 0.26 KW/h.
1:25 Power 0.23 KW/h, 1⅛ heater on, vessel 10 pressure 345 kPa (50 psig), 104 Hz.
PM Pull sample from Cold trap 30.
Tag MBM-34-F in ice pack.
3:30 Shut down.
Day 14: Continue MBM-34
7:40 Turn shear pump 5 on.
AM Today target temperature 120° C.
9:05 Temperature of 120° C., gas intake very low. Bring temperature down to 95° C.
9:05 Temperature 111° C., power 0.23 KW/h, vessel 10 pressure 345 kPa (50 psig).
10:00 Cut temperature down to 85° C.-90° C. Best gas use on high shear.
11:55 79° C.-80° C., 1½ heaters, pressure 345 kPa (50 psig). Power 0.24 KW/h.
3:30 PM Shut down—very little liquid drain today.
Day 15: Continue MBM-34
7:00 Start up temperature 20° C., pressure 137.9 kPa (20 psig).
AM Turn heater on—target 80° C.
High shear 104 Hz.
10:20 Temperature 80° C., pressure 345 kPa (50 psig) on vessel 10, power 0.23 KW/h.
Day 16: Continue MBM-34
2:00 PM Raise temperature as high as possible.
3:00 Temperature 135° C., cut heaters off, empty cold trap 30 receiver.
3:30 Shut down.
Day 17: Continue MBM-34
7:00 Turn Pump 5, Shear 40 on—104 Hz.
AM Temperature 25° C. Today's target temperature is 80° C.
7:35 Temperature 80° C., power 0.23 KW/h, pressure 345 kPa (50 psig).
1:00 PM Temperature 80° C., pressure 345 kPa (50 psig), power 0.23 KW/h.
2:30 Increase temperature with 3 heaters to 130° C. to boil out methmethanol into cold trap 30.
Day 18: Continue Running All Day
Day 19: Continue Running All Day
Day 20: Complete MBM 34: Running All Day
Midday: Pump seal leak. Shut down—empty vessel 10. Replace shaft & seal.
Day 29: MBM 35: $CO_2$ and Methane
Mixed 195 grams Palladium Silica (Pd/Si) in 500 mL SK Group 4 oil
Days 30 and 31: Continuously Mix PdSi/Group 4 Oil Mixture Over Week-End at 1800 RPM to Produce Fine Catalyst (60 Hours)
Day 32: Continue MBM 35
8:15 Put 3½ liters of SK oil in vessel 10 then added 500 mL SK oil with catalyst. Turned AM mixer 31 on and pump 5 on finished adding the rest of 7 liters of oil
8:25 Pump Shear on max 105 Hz and all three heaters are on. Target temperature is 200° C.
Keep purging gas from cold trap 30.
8:30 All gas is on, line temperature 38° C.
8:30 Power meter 0.24 KW/h.
Totalizer on power meter 26 KW.
Compressor 50 is online.
8:40 Finished purging gas from vessel 10 at top of cold trap 30.
Temperature is 50° C.
8:55 Temperature is 65° C. Blew water from jacket of vessel 10.
Power is 0.24 KW/h. All three heaters H1, H2, H3 on.
9:15 Vessel 10 temperature is 100° C.
9:20 Vessel 10 temperature is 109° C. Power is 0.24 KW/h.
10:05 Cut heaters off—temperature 155° C.
10:12 Turn heaters on. Cut compressor 50 off to raise temperature to 200° C.
Temperature is 137° C.
10:22 Temperature is 144° C.
10:35 Methane reading is 2300.5 sccm on meter.
$CO_2$ reading is 185.5 CFM on meter.
Temperature is 159° C.
10:45 Temperature is 165° C. Power meter reading 0.23 KW/h.
10:50 Totalizer reading is 96370 on $CO_2$.
12:15 Temperature is 186° C. Switch to new methane cylinder. Power is 0.23 KW/h.
PM Totalizer reading is 27 KW.
1:00 Temperature is 183° C.
2:00 Methane cylinder at 1700. Temperature is 197° C. Power 0.23 KW/h. Totalizer on power 27 KW.
2:20 Temperature is 201° C. Power is 0.23 KW/h.
Methane reading is 2300.8 SCCM. $CO_2$ is 200 CFM.
Day 33: Continue MBM 35
9:15 AM Pull Sample from Cold Trap—Tag: MBM 35-A.
Day 35: Continue MBM 35
9:20 AM Pull Gas Sample—Tag: MBM 35-1.
9:30 Pull Sample from Cold Trap—Tag: MBM 35-B Water.
Pull Sample from Reactor—Tag: MBM 35-B Oil.
Day 36: Complete MBM 35
8:45 AM Pull Cold Trap Sample—Tag: MBM 35-D.
Pull Reactor Sample—Tag: MBM 35-E.
Pull Gas Sample—Tag: MBM 35-2
Shut Down Run.
What is claimed is:

1. A method for producing a product comprising at least one selected from $C_{2+}$ hydrocarbons, oxygenates, and combinations thereof from a light gas comprising one or more gas selected from the group consisting of carbon dioxide, methane, ethane, propane, butane, pentane and methanol, the method comprising:
    forming a dispersion of the light gas in a liquid feed comprising one or more fluids selected from (1) hydrogen sources selected from the group consisting of water, liquid alkanes and paraffinic oils and (2) liquid carriers, wherein the dispersion is formed at least in part with high shear forces and wherein at least one of the liquid feed and the light gas comprises a hydrogen source, whereby the product comprising at least one selected from $C_{2+}$ hydrocarbons, oxygenates, and combinations thereof is formed.

2. The method of claim 1 wherein forming a dispersion comprises generating bubbles of light gas having a mean diameter in the range of about 0.1 to about 1.5 micron.

3. The method of claim 2 wherein the gas bubbles have a mean diameter less than about 0.4 micron.

4. The method of claim 1 wherein forming the dispersion comprises subjecting a mixture of the light gas and the liquid feed to a shear rate of greater than about $20{,}000 s^{-1}$.

5. The method of claim 1 wherein the high shear forces are produced with at least one high shear device.

6. The method of claim 5 wherein the at least one high shear device comprises at least one generator comprising a stator and a complementary rotor.

7. The method of claim 6 wherein the rotor and stator are separated by a minimum clearance in the range of from about 0.02 mm to about 3 mm.

8. The method of claim 6 wherein forming the dispersion comprises a tip speed of the rotor of greater than 5.0 m/s (1000 ft/min).

9. The method of claim 6 wherein forming the dispersion comprises a tip speed of the rotor of greater than 20 m/s (4000 ft/min).

10. The method of claim 6 wherein the at least one high shear device comprises at least two generators.

11. The method of claim 6 wherein the high shear device produces a local pressure of at least about 1034.2 MPa (150,000 psi) at the tip of the rotor during formation of the dispersion.

12. The method of claim 5 wherein the energy expenditure of the high shear device is greater than 1000 $W/m^3$ during formation of the dispersion.

13. The method of claim 1 wherein the dispersion further comprises a catalyst.

14. The method of claim 13 wherein the catalyst comprises ruthenium.

15. The method of claim 14 wherein the catalyst comprises ruthenium trichloride heptahydrate, ruthenium carbonyl, or a combination thereof.

16. The method of claim 1 further comprising introducing the dispersion into a fixed bed reactor comprising a bed of catalyst.

17. The method of claim 1 wherein the hydrogen source is selected from water, alkanes, and combinations thereof.

18. A method for producing a product comprising at least one selected from liquid oxygenates, $C_{2+}$ hydrocarbons, and combinations thereof, the method comprising:
   subjecting a fluid mixture comprising a light gas comprising carbon dioxide, methane, or both and a liquid medium comprising one or more fluids selected from the group consisting of water, liquid alkanes, paraffinic oils and polyethylene glycol to a shear rate greater than $20{,}000 s^{-1}$ to produce a dispersion of light gas in a continuous phase of the liquid, wherein at least one of the liquid feed and the light gas comprises a hydrogen source and wherein the dispersion is formed at least in part with at least one high shear device, the at least one high shear device configured to produce a dispersion of bubbles of the light gas in the liquid medium; and
   introducing the dispersion into a reactor from which the product comprising at least one selected from liquid oxygenates, $C_{2+}$ hydrocarbons, and combinations thereof is removed.

19. The method of claim 18 further comprising:
   separating the reactor product into a gas stream and a liquid product stream comprising liquid product; and
   recycling at least a portion of the gas stream to the at least one high shear device.

20. The method of claim 18 wherein the average bubble diameter of the light gas bubbles in the dispersion is in the range of about 0.1 to about 1.5 micron.

21. The method of claim 18 wherein the average bubble diameter of the light gas bubbles in the dispersion is less than 1 micron.

22. The method of claim 18 wherein the dispersion is stable for at least about 15 minutes at atmospheric pressure.

23. The method of claim 18 wherein the high shear device comprises at least two generators.

24. The method of claim 18 wherein the dispersion further comprises at least one catalyst.

* * * * *